US011673007B2

(12) United States Patent
Tousi et al.

(10) Patent No.: US 11,673,007 B2
(45) Date of Patent: Jun. 13, 2023

(54) PERSONAL PROTECTIVE EQUIPMENT THAT EMPLOYS NANOPARTICLES OF TWO DIFFERENT METALS THAT GENERATE AN ELECTRIC FIELD FOR INACTIVATING MICROORGANISMS

(71) Applicants: Saied Tousi, Las Vegas, NV (US); Mohammad Taghi Fatehi, Irvine, CA (US)

(72) Inventors: Saied Tousi, Las Vegas, NV (US); Mohammad Taghi Fatehi, Irvine, CA (US)

( * ) Notice: Subject to any disclaimer, the term of this patent is extended or adjusted under 35 U.S.C. 154(b) by 0 days.

(21) Appl. No.: 17/966,801

(22) Filed: Oct. 15, 2022

(65) Prior Publication Data

US 2023/0033719 A1 Feb. 2, 2023

Related U.S. Application Data

(63) Continuation-in-part of application No. 17/561,407, filed on Dec. 23, 2021, now Pat. No. 11,471,713.
(Continued)

(51) Int. Cl.
*B01D 53/02* (2006.01)
*A62B 23/02* (2006.01)
(Continued)

(52) U.S. Cl.
CPC ............. *A62B 23/02* (2013.01); *A41D 13/11* (2013.01); *B01D 39/1623* (2013.01); *B01D 46/0032* (2013.01)

(58) Field of Classification Search
CPC .... A62B 23/02; A41D 13/11; B01D 39/1623; B01D 46/0032
See application file for complete search history.

(56) References Cited

U.S. PATENT DOCUMENTS 5,484,472 A 1/1996 Weinberg
5,845,488 A 12/1998 Hancock et al.
(Continued)

FOREIGN PATENT DOCUMENTS

BG 3922 U1 * 10/2020

OTHER PUBLICATIONS

Translation of BG-3922-U1; Koycho (Year: 2020).*
(Continued)

*Primary Examiner* — Christopher P Jones
(74) *Attorney, Agent, or Firm* — Makoui Law, PC; Ali Makoui

(57) ABSTRACT

A mask with at least one filtering layer that includes a fabric made of non-conductive polymer fibers embedded with nanoparticles of two different metals is provided. The population density of the nanoparticles of the two metals on the surface of non-conductive polymer fibers is configured such that the adjacent nanoparticles of the two metals have an average distance of two micrometers or less. The two different metals are selected such that the electric field intensity generated between the nanoparticles of the two different metal through the aerosol particle inactivates the microorganisms that may be inside the aerosol particle. When an aerosol particle comes into contact with the nanoparticles of the two metals, the aerosol acts as an electrolyte between the two metal types and a potential difference and an electric field is generated, through the aerosol particle, between the nanoparticles of the two metals.

9 Claims, 25 Drawing Sheets

Related U.S. Application Data

(60) Provisional application No. 63/130,564, filed on Dec. 24, 2020.

(51) Int. Cl.
*B01D 39/16* (2006.01)
*B01D 46/00* (2022.01)
*A41D 13/11* (2006.01)

(56) References Cited

U.S. PATENT DOCUMENTS

| | | | |
|---|---|---|---|
| 6,660,068 | B1 | 12/2003 | Garner et al. |
| 7,672,719 | B2 | 3/2010 | Skiba et al. |
| 7,813,806 | B2 | 10/2010 | Skiba |
| 7,904,147 | B2 | 3/2011 | Schneider et al. |
| 9,511,215 | B2 | 12/2016 | Skiba et al. |
| 9,731,109 | B2 | 8/2017 | Skiba et al. |
| 10,307,587 | B2 | 6/2019 | King et al. |
| 10,406,347 | B2 | 9/2019 | Skiba et al. |
| 10,912,961 | B2 | 2/2021 | Seo et al. |
| 11,471,713 | B2 | 10/2022 | Fatehi et al. |
| 2006/0008442 | A1* | 1/2006 | MacDonald ......... B01J 20/0229 428/323 |
| 2014/0150797 | A1 | 6/2014 | Cheung |
| 2015/0082980 | A1 | 3/2015 | Liu et al. |
| 2016/0136335 | A1* | 5/2016 | Dehnad ................. A61L 29/106 204/290.13 |
| 2018/0093013 | A1* | 4/2018 | Dehnad ................. A61K 33/242 |
| 2019/0160404 | A1 | 5/2019 | Smithies |
| 2021/0187428 | A1 | 6/2021 | Yang et al. |
| 2021/0244111 | A1 | 8/2021 | Lai et al. |
| 2021/0299485 | A1 | 9/2021 | Cubon |
| 2021/0316171 | A1 | 10/2021 | Zhamu et al. |
| 2021/0339060 | A1 | 11/2021 | Retti et al. |
| 2021/0339269 | A1 | 11/2021 | Kuntz |
| 2021/0346728 | A1 | 11/2021 | Fischer et al. |
| 2021/0386144 | A1 | 12/2021 | Wiklof et al. |
| 2021/0394197 | A1 | 12/2021 | Vanjani et al. |
| 2022/0023682 | A1 | 1/2022 | Lee |
| 2022/0062391 | A1 | 3/2022 | Dean |
| 2022/0143435 | A1 | 5/2022 | Shohan |

OTHER PUBLICATIONS

Faccini, M., et al., "Development of Protective Clothing against Nanoparticle Based on Electrospun Nanofibers," Journal of Nanomaterials, vol. 2012, Apr. 2012, pp. 1-9.

Skaria, Shaji D. et al., "Respiratory Source Control Using Surgical Masks With Nanofiber Media,"Ann. Occup. Hyg., vol. 58, No. 6, Apr. 2014, pp. 771-781.

Portions of prosecution history of U.S. Appl. No. 17/561,407, filed Sep. 28, 2022, Mohammad T Fatehi, et al., Portions of prosecution history of commonly owned U.S. Appl. No. 17/561,407, listed as item #11 above, including actions and/or responses/.

Johan E. Nyrop, "A Specific Effect of High-Frequency Electric Currents on Biological Objects," Nature, Jan. 12, 1946, No. 3976, pp. 51.

Mizuno, Akira, et al., "Inactivation of viruses using pulsed high electric field," Conference Record of the 1990 IEEE Industry Applications Society Annual Meeting, Oct. 1990, vol. 1, pp. 713-719.

Bawcom, Danny W., et al., "Reduction of Microorganisms on Beef Surfaces Utilizing Electricity," Journal of Food Protection, vol. 58, No. 1, Apr. 1994, pp. 35-38.

Yao, Maosheng, et al., "Inactivation of Microorganisms Using Electrostatic Fields," Environmental Science & Technology, vol. 39, No. 9, Mar. 2005, pp. 3338-3344.

Yang, Shinhao, et al., "The Size and Concentration of Droplets Generated by Coughing in Human Subjects," Journal of Aerosol Medicine, vol. 20, No. 4, month unknow, 2007, pp. 484-494.

Cosic, Irena, et al., "Is it possible to predict electromagnetic resonances in proteins, DNA and RNA?", EPJ Nonlinear Biomedical Physics, May 23, 2015, pp. 1-8.

Payen, Julien, et al., "Influence of fiber diameter, fiber combinations and solid volume fraction on air filtration properties in nonwovens," Textile Research Journal, vol. 82, Issue 19, Jun. 26, 2012, pp. 1948-1959.

Lee, Jinho, et al., "Quantity, Size Distribution, and Characteristics of Cough-generated Aerosol Produced by Patients with an Upper Respiratory Tract Infection," Taiwan Association for Aerosol Research, vol. 19, Issue 4, Apr. 2019, pp. 840-853.

Scudellari, Megan, "Using Weak Electric Fields to Make Virus-Killing Face Masks," IEEE Spectrum, May 28, 2020.

\* cited by examiner

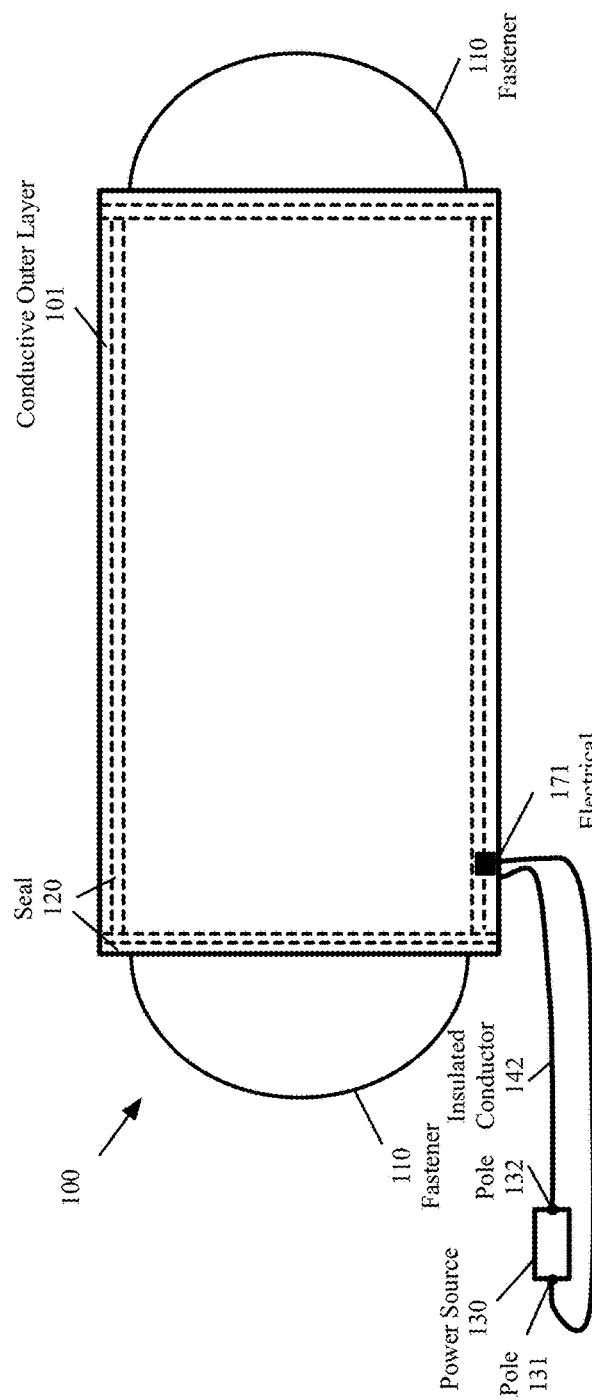
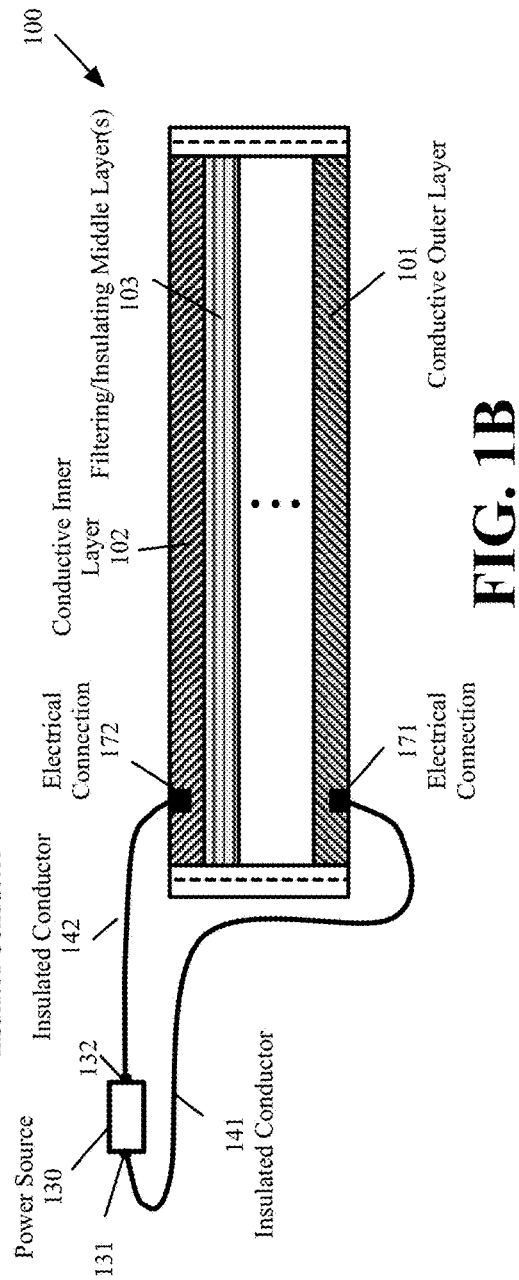
FIG. 1A
FIG. 1B

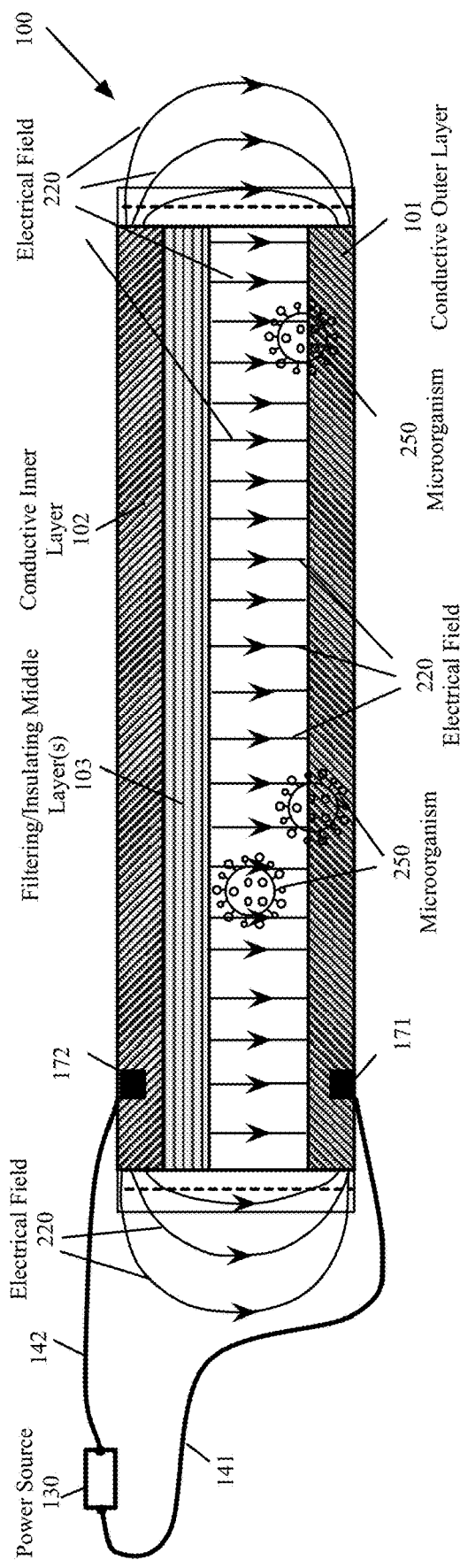
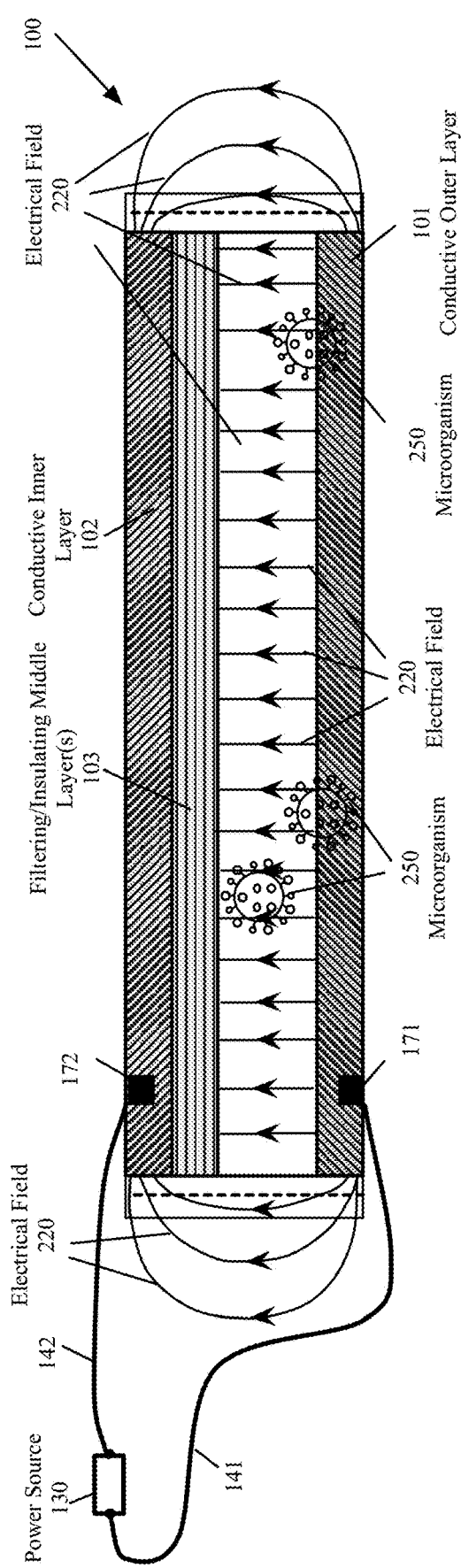
FIG. 2A
FIG. 2B

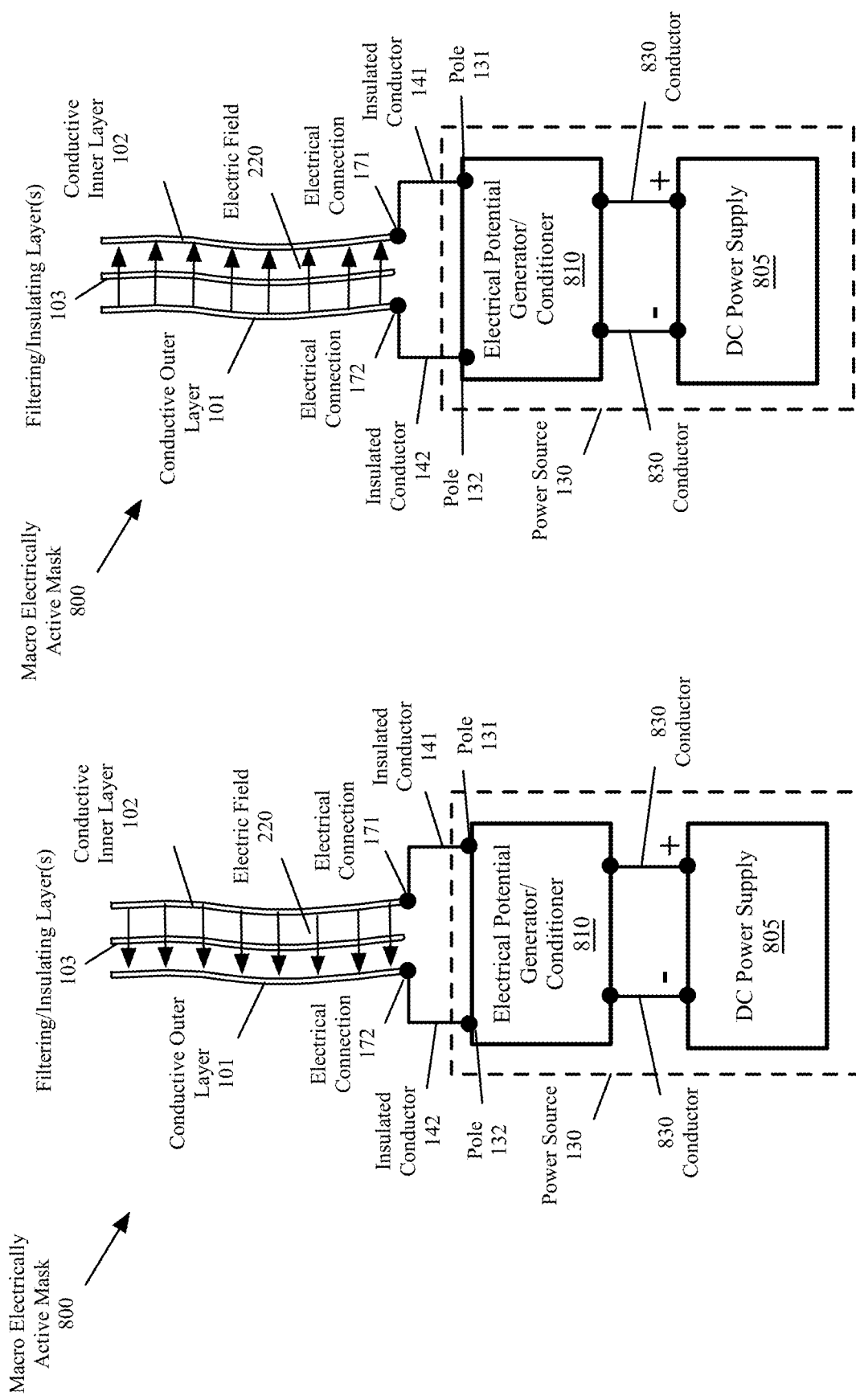

PERSONAL PROTECTIVE EQUIPMENT THAT EMPLOYS NANOPARTICLES OF TWO DIFFERENT METALS THAT GENERATE AN ELECTRIC FIELD FOR INACTIVATING MICROORGANISMS

CLAIM OF BENEFIT TO PRIOR APPLICATIONS

This application is a continuation-in-part of U.S. patent application Ser. No. 17/561,407, filed on Dec. 23, 2021, published as U.S. Patent Publication No. 2022/0203141. U.S. patent application Ser. No. 17/561,407 claims the benefit of U.S. Provisional Patent Application Ser. No. 63/130,564, filed on Dec. 24, 2020. The contents of U.S. patent application Ser. No. 17/561,407, published as U.S. Patent Publication No. 2022/0203141 and U.S. Provisional Patent Application 63/130,564 are hereby incorporated by reference.

BACKGROUND

Personal protective equipment (PPE) are pieces of clothing such as gowns and footwear covers, and pieces of gear such as face masks that are used to protect the wearer's body from injury or infection. Of particular interest is protecting a wearer against microorganisms, such as viruses, bacteria, and fungi. Face masks, also referred to as respirators, are commonly used to protect health care workers and general public from microorganisms.

One example of such face mask is an N95 filtering facepiece respirator commonly abbreviated as N95 respirator that meets the U.S. National Institute for Occupational Safety and Health N95 classification for filtering at least 95% of airborne particles. Another example of a face mask is a surgical mask that is intended to be worn by health professionals and are designed to catch the bacteria shed in liquid droplets and aerosols. Other examples include the European EN 149 FFP2 respirators and Chinese KN95 respirators.

There are also studies indicating the airborne droplets may settle on the ground or on the clothing of person in the vicinity of an infected person. Wearing proper gowns, footwear covers, etc., and changing them often may, therefore, prevent carrying the infectious microorganisms around.

BRIEF DESCRIPTION OF THE DRAWINGS

The various embodiments of the present personal protective equipment that employs an electric field for inactivating microorganisms now will be discussed in detail with an emphasis on highlighting the advantageous features. These embodiments depict the novel and non-obvious personal protective equipment that employs an electric field for inactivating microorganisms shown in the accompanying drawings, which are for illustrative purposes only. These drawings include the following figures, in which like numerals indicate like parts:

FIG. 1A is a front view of a macro electrically active mask, according to various aspects of the present disclosure;

FIG. 1B is a top cross-sectional view of the macro electrically active mask of FIG. 1A, according to various aspects of the present disclosure;

FIGS. 2A-2B are functional diagrams illustrating the potential difference and the corresponding electric field generated between the two conductive layers of the mask of FIGS. 1A-1B, according to various aspects of the present disclosure;

FIGS. 8A-8B are electrical block diagrams of a multi-layer macro electrically active mask, according to various aspects of the present disclosure;

FIG. 11 is a front view of a portion of a non-conductive polymer fiber embedded with nanoparticles of two different metals, according to various aspects of the present disclosure;

DETAILED DESCRIPTION

Figure 3A:
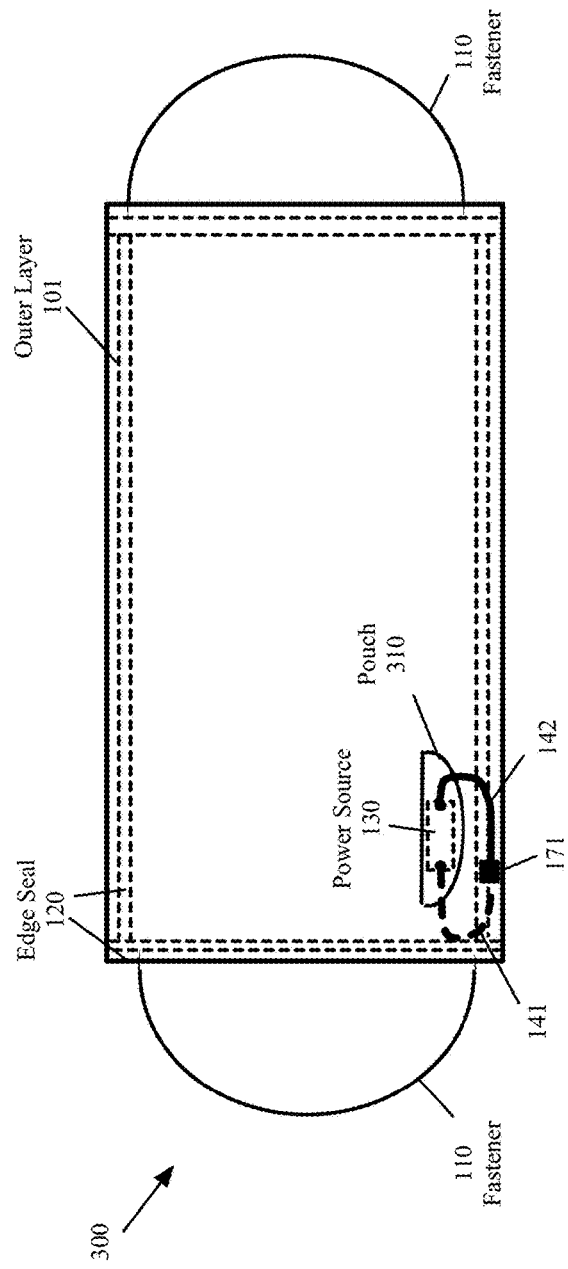
FIG. 3A is a front view of a macro electrically active mask, where the power source is kept in a pouch on the mask, according to various aspects of the present disclosure.

One aspect of the present embodiments includes the realization that the existing face masks and respirators that are made to stop microorganisms such as viruses, bacteria, and/or fungi have several layers of filtering material. The filtering material should allow air to pass through in order for a person wearing the mask or respirator to be able to breathe. At the same time, the filtering material should stop the microorganisms to reach the person's mouth and nose. The ratings of the masks and respirators, for example, N95, indicates that at least 95% of airborne particles (e.g., 95% of the most penetrating particle size (MPPS) of 0.3 micrometers) should be stopped by these masks and respirators. The filtered airborne particles, however, may stay active on different layers of the existing masks, which may cause contamination when the mask comes in contact with a person's hands, or the mask is left on a surface. Microorganisms on the surfaces of other types of the currently used PPE, such as gowns and footwear cover, may also generate cross contamination when touched by a person or left on a surface.

The present embodiments, as described in detail below, solve the above-mentioned problem by providing masks and respirators with different types of mechanisms that generate electric fields, which make microorganisms inactive. Some embodiments may provide a macro electrically active mask that includes two conductive layers separated by one or more filtering and/or insulating layers. The two conductive layers are connected to each other by a power source. The power source may be configured such that the electric field generated between the two conductive layers may inactivate the microorganism that may pass through the electric field. Other types of PPE, such as gowns and footwear cover may include two conductive layers separated by at least one non-conductive layer, where the two conductive layers are connected to each other by the power source to generate an electric field between the two conductive layers to inactivate microorganisms.

Some embodiments may provide a mask with at least one filtering layer that includes a fabric made of non-conductive polymer fibers embedded with nanoparticles of two different metals. When an aerosol particle comes into contact with the nanoparticles of the two metals, the aerosol acts as an electrolyte between the two metal types and, as a result, a potential difference and an electric field may be generated, through the aerosol particle, between the nanoparticles of the two metals. The electric field may inactivate microorganisms that may be inside the aerosol particle. Other types of PPE, such as gowns and footwear cover, may include a fabric made of non-conductive polymer fibers embedded with nanoparticles of two different metals to inactivate microorganisms in aerosol particles.

Some embodiments may provide a mask with at least one filtering layer that includes a fabric made of a non-conductive polymer fibers embedded with nanofibers of two different metals. When an aerosol particle comes into contact with the nanofibers of the two metals, the aerosol acts as an electrolyte between the two metal nanofibers and an electric field may be generated, through the aerosol particle, between the nanofibers of the two metals. The electric field may inactivate microorganisms that may be inside the aerosol particle. Other types of PPE, such as gowns and footwear cover, may include a fabric made of non-conductive polymer fibers embedded with nanofibers of two different metals to inactivate microorganisms in aerosol particles.

The remaining detailed description describes the present embodiments with reference to the drawings. In the drawings, reference numbers label elements of the present embodiments. These reference numbers are reproduced below in connection with the discussion of the corresponding drawing features.

I. Macro Electrically Active PPE

Some of the present embodiments provide macro electrically active PPE. The PPE may be made of two conductive layers of fabric, may be separated by at least one layer of non-conductive fabric, and may be connected to a periodic voltage power source. FIG. 1A is a front view of a macro electrically active mask, according to various aspects of the present disclosure. FIG. 1B is a top cross-sectional view of the macro electrically active mask of FIG. 1A, according to various aspects of the present disclosure. The terms face mask, mask, and respirator are used interchangeably in this disclosure.

With reference to FIGS. 1A and 1B, the macro electrically active mask 100 may include a conductive outer layer 101, a conductive inner layer 102, and one or more non-conductive filtering/insulating middle layers 103. In the example of FIGS. 1A and 1B, the conductive outer layer 101, the conductive inner layer 102, and the non-conductive filtering/insulating middle layer(s) 103 may be sealed (as shown by 120) by different techniques such as hot pressing, sewing, etc. As described below with reference to FIGS. 4A-4B, some embodiments may include an additional non-conductive layer between the inner conductive layer 102 and the face of the person who is wearing the mask 100.

The macro electrically active mask 100 may be worn by a person by placing the fasteners (or bands) 110 around the ears such the conductive outer layer is away from the wearer' face (the fasteners 110 are not shown in FIG. 1B for simplicity). The fasteners, in some embodiments, may be made such that the fasteners may be placed behind the neck of the wearer's face to secure the mask.

The conductive layers 101 and 102 may be made of a conductive fabric. The conductive fabric, in some embodiments, may be made of metal strands woven into the construction of the fabric or by metal-coated yarns. The conductive fabric, in some embodiments, may include a non-conductive substrate, which is coated or embedded with electrically conductive elements. One example of a stretchable conductive fabric is the conductive Lycra® fabric.

With further reference to FIGS. 1A and 1B, a power source 130 may be used to generate a periodic electric field between the conductive outer layer 101 and the conductive inner layer 102. The pole 131 of the power source 130 may be connected by a flexible insulated conductor (e.g., an insulated wire) 141 and an electrical connection 171 to the conductive outer layer 101. The pole 132 of the power source 130 may be connected by a flexible insulated conductor (e.g., an insulated wire) 142 and an electrical connection 172 to the conductive inner layer 102. The power source 130 may include one or more batteries and an electrical potential generator/conditioner to convert the direct current (DC) voltage generated by the batteries to a periodic voltage, as described below with reference to FIGS. 8A-8C.

The non-conductive filtering/insulating middle layer(s) 103 may be made of a non-conductive fabric with filtering properties, such as, for example, and without limitations, the material used in surgical masks, in the N95 respirators, in the KN95 respirators, in the fabric masks, etc. Examples of the fabric for the filtering/insulating middle layer(s) 103 include, for example, and without limitations, fabrics made of synthetic fibers such as nonwoven polypropylene or nonwoven polyester. The fabric, in some embodiments, may be made as a fine mesh by a process such as melt blowing. Another example of the fabric for the filtering/insulating middle layer(s) 103 is common textiles, such as cotton, nylon, silk, etc. Another example of the fabric for the filtering/insulating middle layer(s) 103 is fabric meeting the high-efficiency particulate air (HEPA) standard.

With further reference to FIGS. 1A and 1B, the power source may generate a periodic potential difference between the conductive outer layer 101 and the conductive inner layer 102. FIGS. 2A-2B are functional diagrams illustrating the potential difference and the corresponding electric field generated between the two conductive layers of the mask of FIGS. 1A-1B, according to various aspects of the present disclosure. As described below with reference to FIGS. 8A-8B, the power source 130 may be configured to generate a periodic voltage between the electrical connections 171-172. In the example of FIG. 2A, the direction of the electric field 220 is shown for a moment when the voltage at the electrical connection 172 is more positive than the voltage at the electrical connector 171. In the example of FIG. 2B, the direction of the electric field 220 is shown for a moment when the voltage at the electrical connection 172 is more negative than the voltage at the electrical connector 171. As shown in FIGS. 2A-2B, the direction of the electric field 220 reverses when the direction of the periodic voltage of the power source 130 changes.

The power source 130 may be configured to generate the electric field 220 with an intensity and a frequency that optimally inactivates the microorganisms 250 that may come in contact with the mask 100. The microorganisms 250 may be, for example, viruses, bacteria, and/or fungi. The periodic electric field 220 may, for example, and without limitations, make the microorganisms 250 unable to reproduce (e.g., by inactivating the deoxyribonucleic acid (DNA) or Ribonucleic acid (RNA) of the microorganism).

In the past, attempts have been made to kill microorganisms that are inside liquid droplets and aerosols by using DC voltage that should be high enough to evaporate the droplets and aerosols that encapsulate the microorganisms. The masks of the present embodiments provide the technical advantage of using periodic electric fields (e.g., high frequency pulsed electric fields) generated by a periodic voltage (e.g., a high frequency pulsed voltage) to inactivate the microorganisms that are inside liquid droplets and aerosols without the need to evaporate the droplets and aerosols. The term aerosol is used herein to refer to a small liquid droplet, such as a respiratory (or cough) droplet made mainly of saliva, which may contain living organisms.

Research work have shown that it is possible to inactivate the DNA and RNA of microorganisms by periodic electric fields without evaporating the encapsulating liquid droplets and aerosols or even without destroying the capsid of the microorganisms. For example, the paper by John E. Nyrop, "A specific effect of high-frequency electric currents on biological objects," Nature, Jan. 12, 1946, pp. 51, performed a systematic investigation of the effect of high-frequency electric currents on biological objects. The experiments described in the paper periodically turned a modulator the current on and off with a frequency of 10-100 kilo cycle (kc) in such manner that the recurring current pulses were separated by current-free periods each being n times longer than the single current impulse. With the modulator employed, variable n was varied between 3 and 20. The paper states that a virus inactivated by heat can be used as a vaccine but the virus inactivated electrically showed no vaccinating effect. The paper indicates this shows that the electrical treatment acts on the virus molecule differently from the heat treatment. The contents of this paper is herein incorporated by reference in its entirety.

The paper by A. Mizuno, et al., "Inactivation of viruses using pulsed high electric field," Conference Record of the 1990 IEEE Industry Applications Society Annual Meeting, 1990, Vol. 1, pp. 713-719, describes the effect of pulsed high electric field on viruses in a liquid. The paper shows that the swine vesicular disease virus (SVDV) in deionized water or in bovine serum could be inactivated effectively when the pulsed electric field (crest value of 30 kV/cm, exponential-decay waveform) was applied 60 to 120 times. After inactivation by the pulse application, the shape of the protein shell of SVDV did not change, but the RNA contained in the core of the SVDV disappeared, and hollow particles were observed. The contents of this paper is herein incorporated by reference in its entirety.

The paper by Irena Cosic, et al., "Is it possible to predict electromagnetic resonances in proteins, DNA and RNA?", EPJ Nonlinear Biomedical Physics, May 23, 2015, shows that there are electromagnetic resonances in biological molecules (proteins, DNA and RNA) in the wide range of frequencies including THz, GHz, MHz and KHz. The paper indicates the finding that protein, DNA and RNA electromagnetic resonances are related to the free electron energy distribution along the macromolecule. The contents of this paper is herein incorporated by reference in its entirety.

The present embodiments, therefore, use the periodic electric fields in inactivate the DNA and RNA of microorganisms that are inside droplets and aerosols that come in contact with, and/or are immobilized by, different layers of the masks. The periodic electric field inactivates the microorganisms without the need of a high DC voltage to evaporate the droplets and aerosols.

Some embodiments may perform a series of tests to determine the required voltage, the frequency of the periodic voltage, the number of pulses (if the periodic voltage is a pulse), the duty cycle of the pulses, etc., in order to deactivate and/or kill a higher percentage of different populations of microorganisms 250. The power source 130 may then be configured to generate a periodic voltage or other optimized electric waveforms based on the experimentations.

It should be noted that, in addition to using the electric field to inactivate the microorganisms, the mask 100 may also include one or more filtering/insulating middle layers 103 that may perform filtering operation similar to a surgical mask, an N95 respirator, a KN95 respirator, a FFP2 respirator, depending on the make and the number of the filtering/insulating middle layers 103. Although the mask 100 in FIGS. 1A-1B is similar to a surgical mask, other embodiments (e.g., as described below with reference to FIGS. 4A-4B) may use a structure similar to an N95 respirator, a KN95 respirator, a FFP2 respirator, etc. It should be further noted that some embodiments may include one or more additional filtering/insulating layers between the conductive inner layer 102 and a face of a wearer in order to provide further filtering of microorganisms and/or to prevent the conductive inner layer 102 to touch the wearer's face.

Figure 3B:
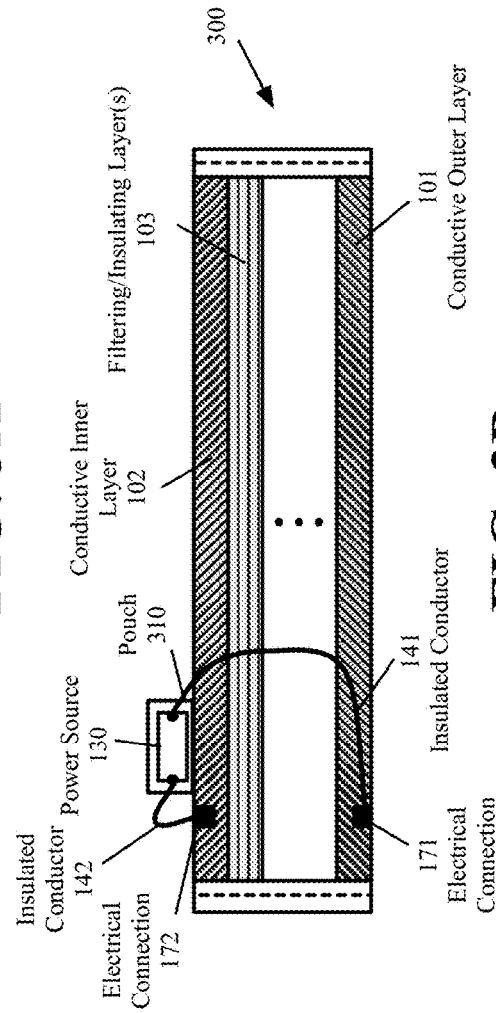
FIG. 3B is a top cross-sectional view of the macro electrically active mask of FIG. 3A, according to various aspects of the present disclosure.

The power source 130, in some embodiments, may be placed in a pouch (or a compartment) and may be secured on the mask, on an item of clothing, or on the body of the person who is wearing the mask 100. FIG. 3A is a front view of a macro electrically active mask, where the power source is kept in a pouch on the mask, according to various aspects of the present disclosure. FIG. 3B is a top cross-sectional view of the macro electrically active mask of FIG. 3A, according to various aspects of the present disclosure.

With reference to FIGS. 3A-3B, a pouch 310 may be attached to the conductive outer layer 101 of the mask 100. For example, the pouch 310 may be made of a non-conductive material, such as, for example, and without limitations, non-conductive fabric, plastic, etc. The pouch 310 may be attached to the conductive outer layer 101 of the mask 300 with an appropriate method such as sewing, gluing, etc. The pouch may be accessed through an opening on the top of the pouch. The opening may be secured with buttons, zippers, hooks, hook-and-loop fastener straps (e.g., the hook-and-loop fasteners provided by Velcro company), cords, etc.

In some of the present embodiments, the number of filtrating/insulating layers 103 may be configured to meet any of different standards for the surgical masks and respirators. For example, the masks shown in FIGS. 1A-1B, 2A-2B, and 3A-3B may be configured to include three filtrating/insulating layers 103 with similar filtering material as the surgical masks to conform with the standard for the surgical masks. As described below with reference to FIGS. 4, the masks and respirators of the present embodiments may be configured to include five filtrating/insulating layers 103 with similar filtering material as the N95, KN95, or PPF2 respirators to conform with the corresponding standards. The macro electrically active masks of the present embodiments provide the technical advantage of the additional protection of generating the periodic electric fields between the conductive layers that inactivates microorganisms while including the same number of filtering layers as a standard respirator or surgical mask.

Figure 4A:
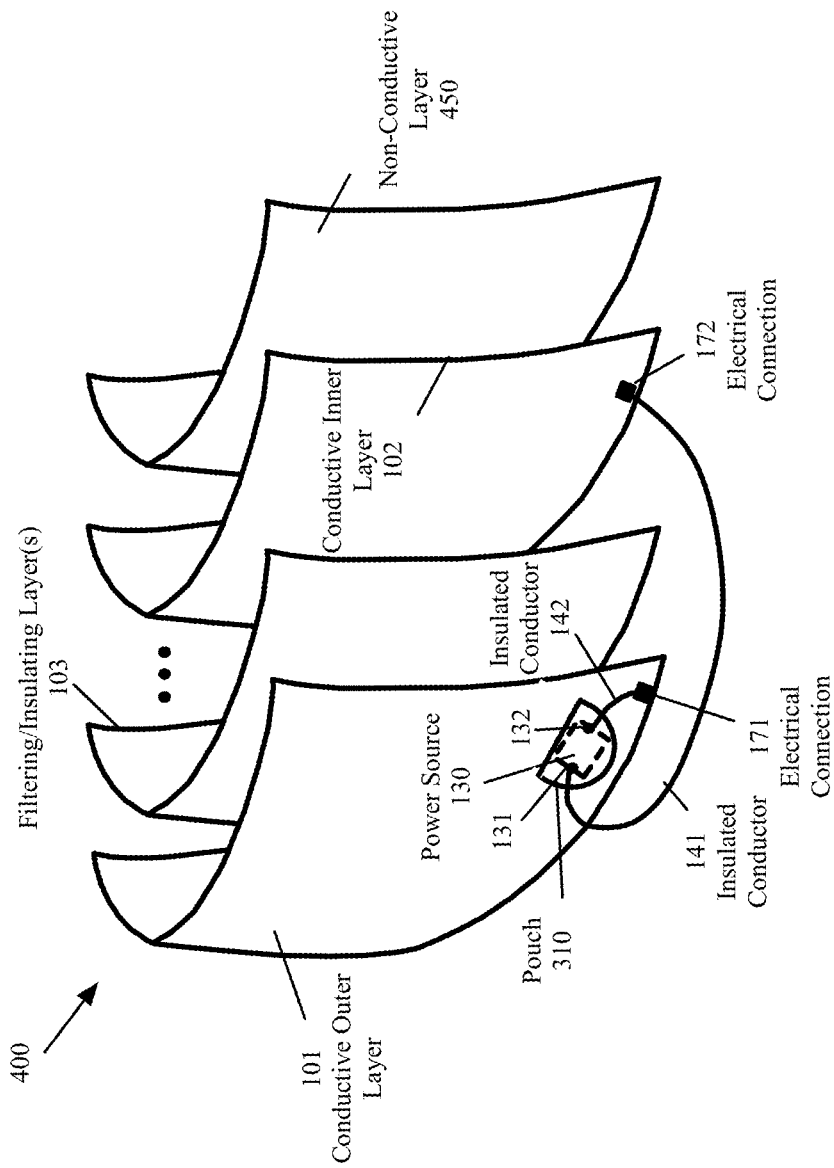
FIG. 4A is a perspective view of a multi-layer macro electrically active respirator, according to various aspects of the present disclosure.

The number of filtrating/insulating layers may be configured to meet other masks or respirators standards. FIG. 4A is a perspective view of a multi-layer macro electrically active respirator, according to various aspects of the present disclosure. With reference to FIG. 4A, the mask 400 may be configured to include a plurality (e.g., and without limitations, five) filtrating/insulating layers 103 with similar filtering material as the N95, KN95, or FFP2 respirators to conform with the corresponding respirator standard. The mask 400 may include a plurality of fasteners (not shown) configured to attach the mask to the face of a wearer such that the mask covers the wearer's mouth and at least a part of the wearer's nose, and respiration air is drawn through the conductive outer layer 101, the filtering/insulating layer(s) 103, and the conductive inner layer 102 layer.

In the embodiment of FIG. 4A, the power source 130 is inside a pouch 310 that is fixed on the conductive outer layer 101. It should be noted that the power source with or without the pouch may be attached to an item of clothing with hook-and-loop fastener straps, clamps, cords, etc. Some embodiments may provide appropriate connectors, for example, a pair of connectors (not shown) to plug and unplug the power source 130 to/from the mask. Some embodiments may include a non-conductive layer 450 that may be positioned between the conductive inner layer 102 and the face of the person that is wearing the mask 400 to separate the face of the person from the conductive layer.

Figure 4B:
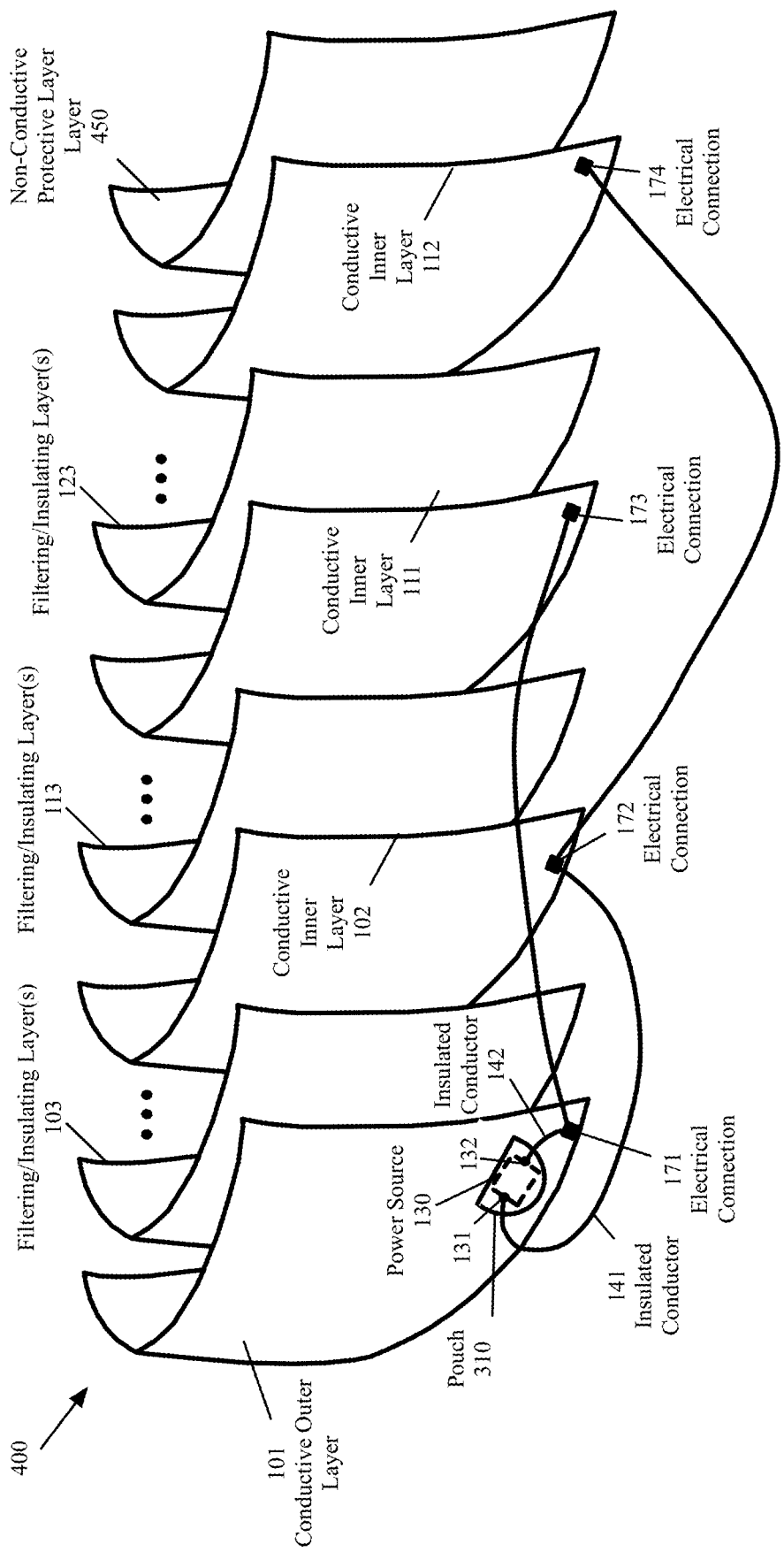
FIG. 4B is a perspective view of a multi-layer macro electrically active respirator with more than two conductive layers, according to various aspects of the present disclosure.

Some embodiments may include additional conductive layers. FIG. 4B is a perspective view of a multi-layer macro electrically active respirator with more than two conductive layers, according to various aspects of the present disclosure. With reference to FIG. 4B, the mask 400 may include more than two conductive layers 101, 102, 111, and 112. As shown, the conductive layers may alternatively be connected to the two poles 451 and 452 of the power source 130 (either daisy chained to each other as shown or directly connected to the poles 131 and 132, not shown). Some embodiments, as the embodiments depicted in FIGS. 4A-4B, may include an even number of conductive layers. Other embodiments may include an even number of conductive layers. For example, and embodiment may include only the conductive layers 101, 102, and 111 that are shown in FIG. 4B. Any number of two or more conductive layers may be used in different embodiments.

Figure 5:
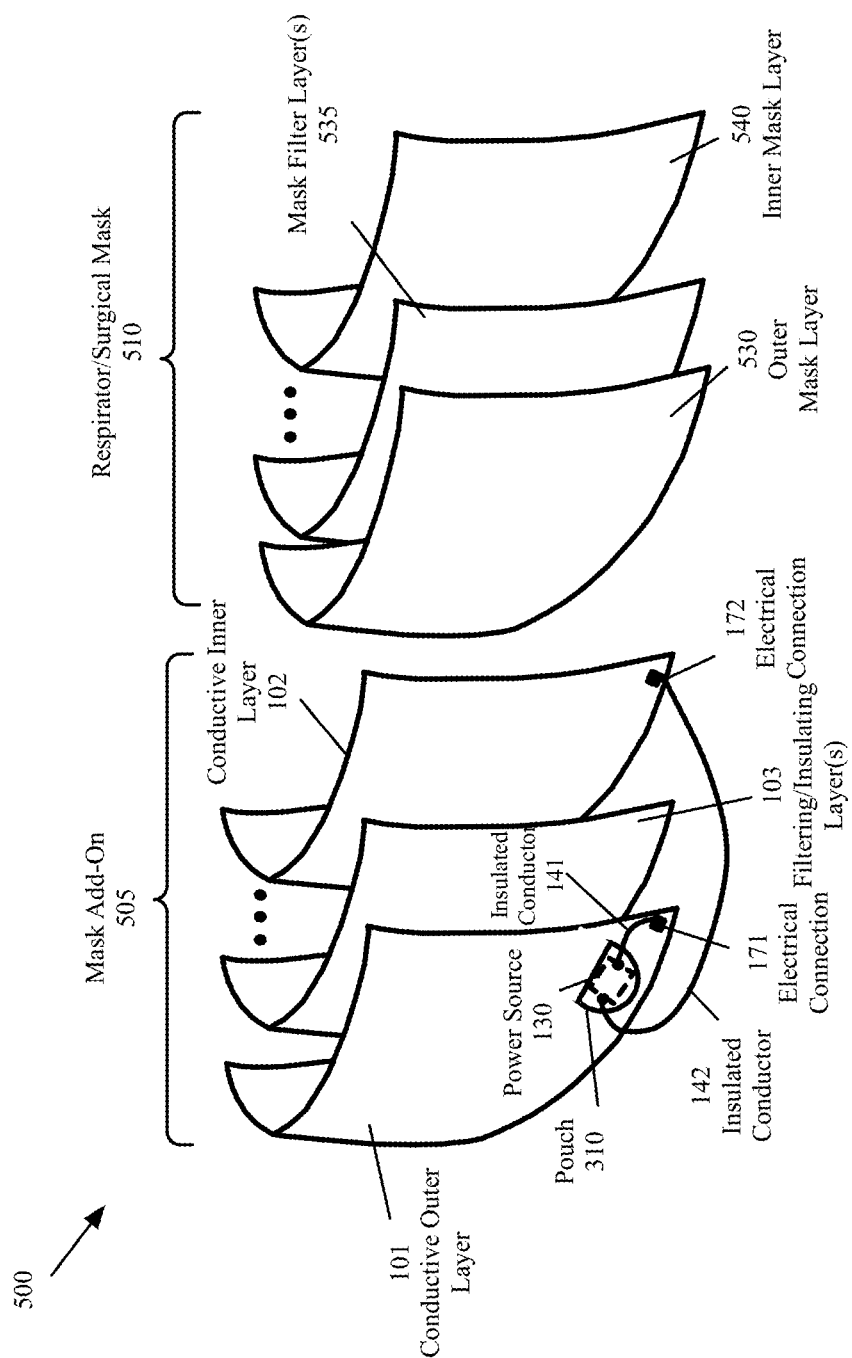
FIG. 5 is a perspective view of a multi-layer macro electrically active mask that may be worn as an add on to a respirator or a surgical mask, according to various aspects of the present disclosure.

The macro electrically active masks, in some embodiments, may be worn as an add-on to a respirator or a surgical mask. FIG. 5 is a perspective view of a multi-layer macro electrically active mask that may be worn as an add on to a respirator or a surgical mask, according to various aspects of the present disclosure. With reference to FIG. 5, the multi-layer respirator with macro electrically active mask 505 may be worn as an add-on over a respirator or a surgical mask 510.

The number of layers 530-540 on the respirator or a surgical mask 510 may be selected to conform to any of the respirator or surgical mask standards indicated above. In addition, the number of filtering/insulating layer(s) 103 of the mask add-on may be kept at a minimum (e.g., at one) to maintain the flow of air into the respirator/surgical mask 510. The system 500 of FIG. 5 has the technical advantage over the standard respirators/surgical masks of providing the additional protection of the electric field between the conductive layers 101 and 102 that inactivate microorganisms before reaching the respirator/surgical mask 510.

Figure 6:
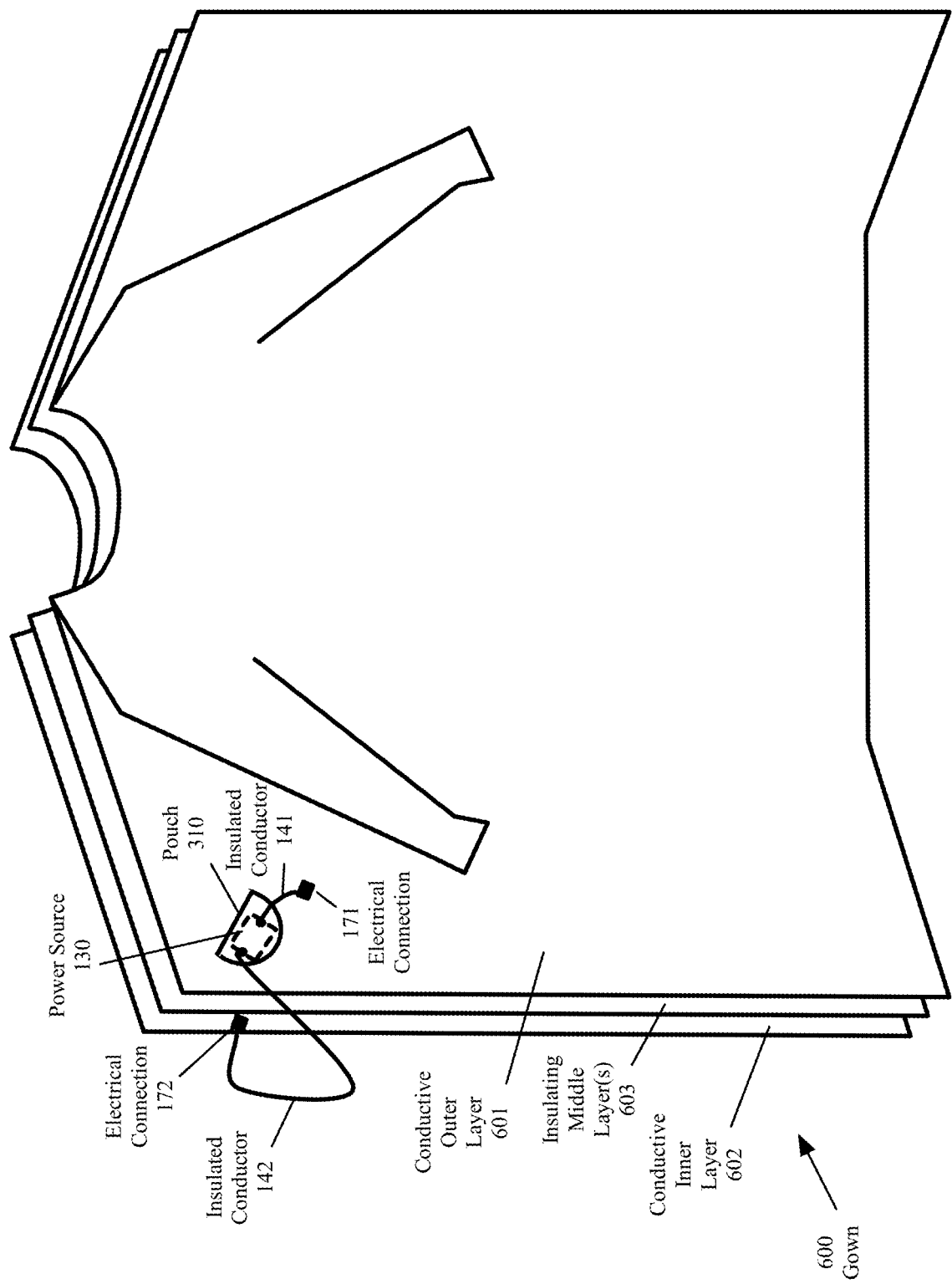
FIG. 6 is a front view of a multi-layer macro electrically active gown, according to various aspects of the present disclosure.

The macro electrically active layers may be included in other PPE, such as, for example, and without limitations, gowns, footwear covers, etc. FIG. 6 is a front view of a multi-layer macro electrically active gown, according to various aspects of the present disclosure. With reference to FIG. 6, the gown 600 may include a conductive outer layer 601, one or more insulating middle layers 603, and a conductive inner layer 602.

The gown 600 may be worn by a person such that the conductive inner layer 602 may be closer to the person's body than the conductive outer layer 601. The conductive layers 601 and 602 may be made of a conductive fabric. The conductive fabric, in some embodiments, may be made with metal strands woven into the construction of the fabric or by metal-coated yarns. The conductive fabric, in some embodiments, may include a non-conductive substrate, which is coated or embedded with electrically conductive elements.

The non-conductive insulating middle layer(s) 603 may be made of a material to conform with one or more standards for the PPE clothing. For example, and without limitations, the non-conductive middle insulating layer(s) 603 may be made of a material that includes polymer fibers such as polyester or polypropylene.

The power source 130 may be placed in a pouch 310, which may be secured on the gown 600. The power source, in some embodiments, may be directly secured on the gown 600, for example, by hook-and-loop fastener straps, by clamps, etc. In some embodiments, the conductive layers 601 and/or 602 may be made of multiple pieces of conductive fabric (e.g., the sleeves may be made of a separate piece of fabric than the body portion of the gown). In these embodiments, the multiple pieces of conductive fabric in each layer may be sewed together by conductive strands and/or each piece of conductive fabric on a layer (e.g., on the outer layer 601 or on the inner layer 602) may include a separate power source, which may be connected to the corresponding piece of the other conductive layer. The location of the power source 130 and/or the location of the electrical connections 171-172 may be adjusted to provide a more efficient electric field between the layers 601 and 602 to inactivate microorganisms.

Figure 7:
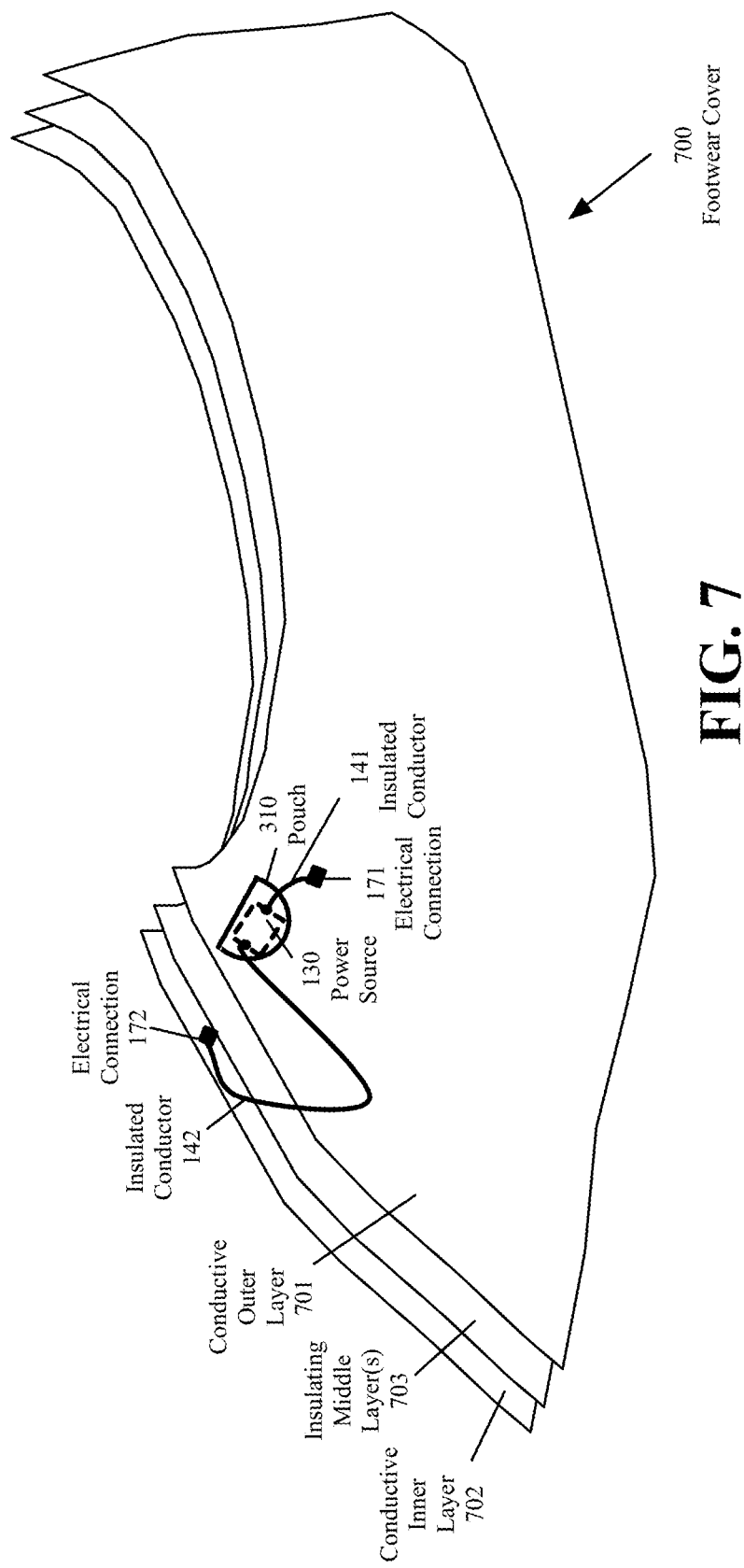
FIG. 7 is a front view of a multi-layer macro electrically active footwear cover, according to various aspects of the present disclosure.

FIG. 7 is a front view of a multi-layer macro electrically active footwear cover, according to various aspects of the present disclosure. With reference to FIG. 7, the footwear cover 700 may be worn over a footwear such as a shoe. The footwear cover 700 may include a conductive outer layer 701, one or more insulating middle layers 703, and a conductive inner layer 702.

The footwear cover 700 may be worn over the footwear such that the conductive inner layer 702 may be closer to the footwear than the conductive outer layer 701. The conductive layers 701 and 702 may be made of a conductive fabric. The conductive fabric, in some embodiments, may be made with metal strands woven into the construction of the fabric or by metal-coated yarns. The conductive fabric, in some embodiments, may include a non-conductive substrate, which is coated or embedded with electrically conductive elements.

The non-conductive insulating middle layer(s) 703 may be made of a material to conform with one or more standards for the PPE clothing. For example, and without limitations, the non-conductive insulating middle layer(s) 703 may be made of a material that includes polymer fibers such as polyester or polypropylene.

The power source 130 may be placed in a pouch 310, which may be secured on the footwear cover 700. The power source, in some embodiments, may be directly secured on the footwear cover 700, for example, by hook-and-loop fastener straps, by clamps, etc. The location of the power source 130 and/or the location of the electrical connections 171-172 may be adjusted to provide a more efficient electric field between the layers 701 and 702 to inactivate microorganisms.

FIGS. 8A-8B are electrical block diagrams of a multi-layer macro electrically active mask, according to various aspects of the present disclosure. With reference to FIGS. 8A-8B, the macro electrically active mask 800 may be any of the masks 100, 300, 400, and 505, described above.

The power source 130 may include a DC power supply 805 and an electrical potential generator/conditioner 810. The DC power supply 805 may include one or more batteries that provide a DC voltage. The batteries, in some embodiments, may be rechargeable batteries, such as, for example, and without limitations, lithium ion (Li-ion) or lithium polymer (LiPo) batteries.

The DC power supply 805 may be connected to the electric potential generator/conditioner 810 by the conductors 830. The electric potential generator/conditioner 130, in some embodiments, may include a transformer (or voltage booster) to amplify the voltage generated by the DC power supply 805. The electric potential generator/conditioner 130, in some embodiments, may include an oscillator or an inverter to convert the DC voltage generated by the DC power supply 805 into a periodic voltage.

In the example of FIG. 8A, the direction of the electric field 220 is shown for a moment when the voltage at the electrical connection 171 is more positive than the voltage at the electrical connector 172. In the example of FIG. 8B, the direction of the electric field 220 is shown for a moment when the voltage at the electrical connection 171 is more negative than the voltage at the electrical connector 172. As shown in FIGS. 8A-8B, the direction of the electric field 220 reverses when the periodic voltage direction of the power source 130 changes.

Figure 8C:
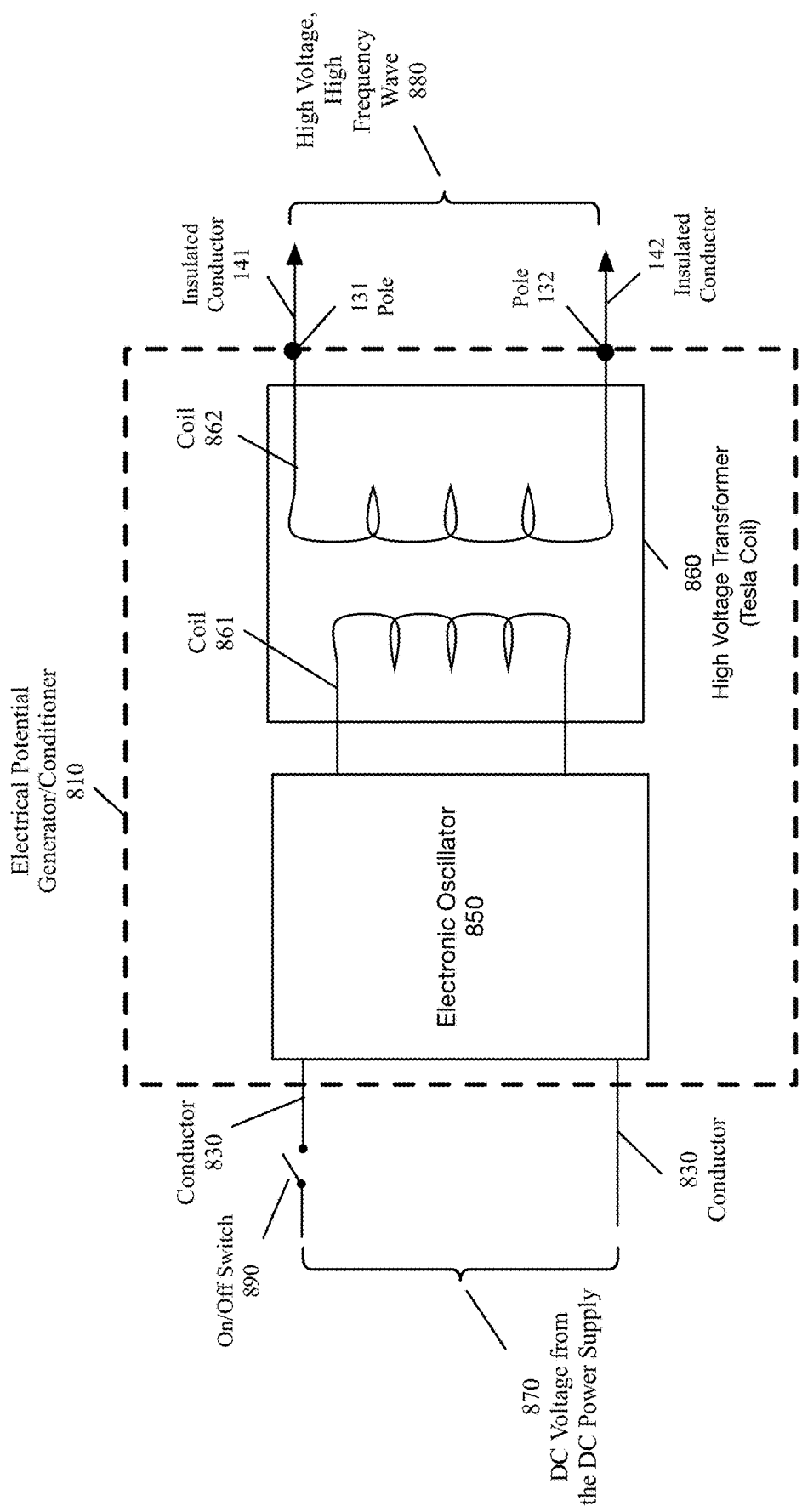
FIG. 8C is an electrical block diagram of an example of the electrical potential generator/conditioner of FIGS. 8A-8B, according to various aspects of the present disclosure.

FIG. 8C is an electrical block diagram of an example of the electrical potential generator/conditioner 810 of FIGS. 8A-8B, according to various aspects of the present disclosure. With reference to FIG. 8C, the electrical potential generator/conditioner 810 may include an electronic oscillator 850 and a high voltage transformer 860, also referred to as a Tesla coil. The power source 130 (FIGS. 8A-8B), in some embodiments, may include an on/off switch 890. The on/off switch 890 may be positioned between the DC power supply source and the electrical potential generator/conditioner 810.

The electronic oscillator 805 may receive DC voltage 870 from the DC power supply 805 (FIGS. 8A-8B). The electronic oscillator 850, in some embodiments, may be an off-the-shelf chip that may receive the DC voltage 870 and may convert the DC voltage to a periodic voltage. The periodic voltage, in different embodiments, may be a pulse wave, a triangle wave, a sawtooth wave, or an irregular-shaped periodic wave. The fundamental frequency of the periodic voltage, in some embodiments, may be in the range of 10 KHZ to 100 KHz.

The fundamental frequency of a periodic waveform is defined as the lowest frequency of the harmonically related frequencies of the periodic waveform. A pulse wave, also referred to as a pulse train or a rectangular wave, is a non-sinusoidal waveform that includes rectangular shaped waves. The shape of a pulse wave is determined by its duty cycle, which is the ratio between the pulse duration and the pulse period. In practice, the pulse waves may not have an ideal rectangular shape, may have non-vertical rising or falling edges, and/or the amplitude of the pulse may not remain exactly the same during the pulse's duration.

The oscillator 850, in some embodiments, may be an electronic circuit that may include a transistor or operational amplifier in a feedback loop with its output fed back to its input through a frequency selective electronic filter to provide positive feedback. The oscillator 850 acts as a power inverter that changes the DC voltage of the DC power supply 805 to a periodic voltage.

As shown, the coil 862 that is positioned at the output of the high voltage transformer 860 has more windings than the coil 861 that is positioned at the input of the high voltage transformer 860. The high voltage transformer may receive the periodic voltage generated by the electronic oscillator 850 through the coil 861 and may amplify the voltage of the waveform at the output of the coil 862. The high voltage transformer may also be configured to condition the waveform by removing the DC and the low frequency components of the waveform. The high voltage transformer may provide current isolation between oscillator and the conductive layers of the mask. Some embodiments may optionally add a DC voltage to the output of the coil 862.

The waveform of the periodic voltage (e.g., pulse wave, triangle wave, sawtooth wave, or irregular-shaped periodic wave), the amplitude, the fundamental frequency, and/or the duty cycle of the periodic wave may be configured such that the electric field 220 generated between the conductive inner layer 102 and the conductive outer layer 101 may inactivate different groups of microorganisms that may come in touch with the mask 800. The desired waveform and its optimal amplitude may be determined through a series of experiments.

Figure 8D:
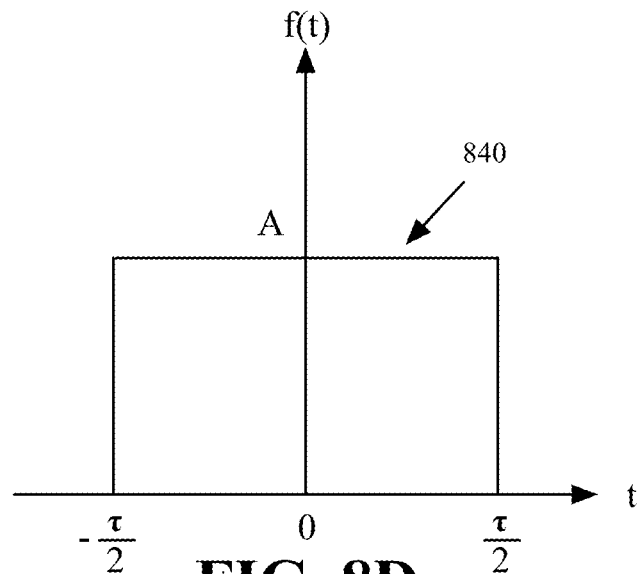
FIG. 8D illustrates a single rectangular pulse function, according to prior art.
Figure 8E:
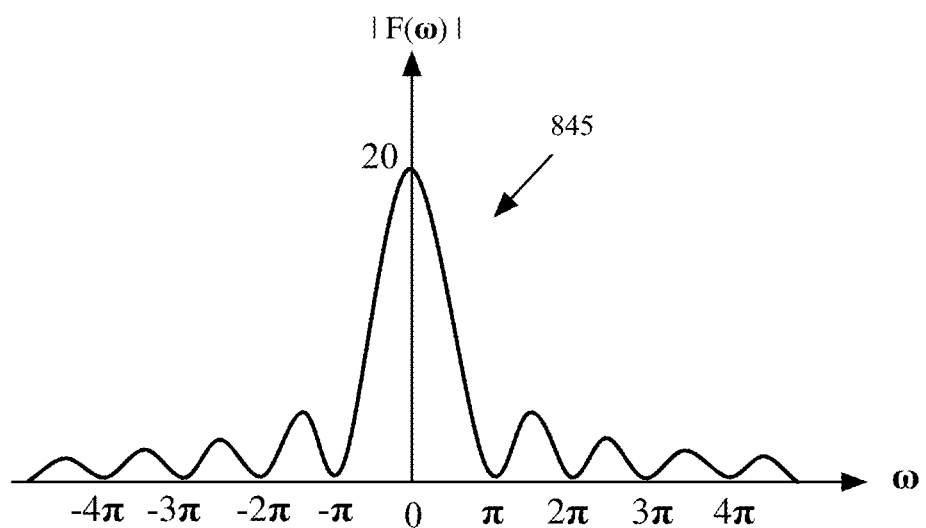
FIG. 8E illustrates the Fourier transform of the pulse function of FIG. 8D, according to prior art.

FIG. 8D illustrates a single rectangular pulse function, f(t), according to prior art. With reference to FIG. 8D, the duration of the pulse 840 is τ and the amplitude of the pulse 840 is A. FIG. 8E illustrates the Fourier transform of the pulse function of FIG. 8D, according to prior art. With reference to FIG. 8E, the function 845, which is a "sine" function, is the Fourier transform of the pulse 840, where f is the frequency and the angular frequency is ω=2πf.

If the above pulse function 840 is repeated periodically, with a period T, and a duty cycle of τ/T, then the waveform is called a "pulsed train." The Fourier transform (or the Fourie series) of such a periodic function is also periodic, with the above frequency spectrum F(ω) centered around the fundamental frequency of the pulse train (instead of 0). In other words, the Fourier transform contains the fundamental frequency as well as all the harmonics. Thus, there is a significant probability that some of these frequencies may be close to the resonance frequency of the target microorganisms, which may cause resonance in the microorganisms and inactivate them. This eliminates the need for multiple oscillators, frequency modulating, or frequency sweeping to inactivate the microorganisms.

For a pulse train, T is the period, the fundamental frequency is f=1/T, and the duty cycle, defined as the fraction of one period where the signal is active (non-zero), is τ/T. When the periodic voltage is a pulse waveform, the frequency domain representation of the waveform may be expressed by the following Fourier series:

$$x(t) = A\frac{\tau}{T} + \frac{2A}{\pi}\sum_{n=1}^{\infty}(\frac{1}{n}\sin(\pi n\frac{\tau}{T})\cos(2\pi nft))$$

where A is the amplitude of the pulse wave, τ is the pulse length, t is time, f is the frequency, T is the period, f=1/T, and the duty cycle, defined as the fraction of one period where the signal is active (non-zero), is τ/T.

Mathematically, the Fourier transform of an ideal impulse (an infinitesimally narrow pulse) function is unity. That means the impulse contains the spectrum of all frequencies. In practice however, sharp pulses, such as rectangular wave functions with low duty cycle contain a fundamental frequency as well as many high frequency harmonics. Narrow pulses, such as those generated by differentiating a square wave (using, e.g., capacitive coupling) whose waveform would look like an exponentially decaying pulse, would contain a wide spectrum of frequencies. In some embodiments, the electronic oscillator 850 and the high voltage transformer 860 may be configured to make the duty cycle of the high voltage, high frequency wave 880 to be 10% or less (e.g., 10%, 1.66%, 1%, etc.) resulting in a sharp out pulse that may include many high frequency harmonics The high voltage transformer, in some embodiments may generate an electric field of at least 30 Kilovolts per centimeter (kv/cm). The high frequency wave 880 may include many harmonic frequencies that may cause resonance on target microorganism and inactivate them. The existence of the harmonic frequencies in the same period wave eliminate the need to modulate a sine frequency signal.

As described above, the high frequencies may result in inactivation of microorganisms that may be encapsulated in the liquid droplets and aerosols that are subject to the high voltage, high frequency wave 880 of the power source of the present embodiments. The high frequencies may cause resonances in the proteins, DNA, and/or RNA of the microorganisms, resulting in the microorganisms inactivation.

The number of filtering/insulating middle layer(s) 103 and the make of the conductive inner layer 102, the conductive outer layer 101, and the filtering/insulating middle layer(s) 103 may be the same as described above with reference to FIGS. 1A-5.

For the PPEs such as the gown 600 (FIG. 6) and the footwear cover (FIG. 7), the electrical block diagram may be similar to the electrical block diagrams of FIGS. 8A-8B, with the exception that the middle layer(s) 103 may not be required to have filtering properties.

II. Personal Protective Equipment with Nanoparticles of Two Different Metals to Inactivate Microorganisms Some embodiments may use fabrics made of non-conductive synthetic fibers that are embedded with two nanoparticles of two different metals to generate an electric field in the presence of an aerosol droplet. The non-conductive synthetic fibers may be polymer fibers.

FIG. 9 is a cross-sectional view of a non-woven polymer fabric with polymer fibers that are embedded with nanoparticles of two different metals, according to various aspects of the present disclosure. With reference to FIG. 9, the polymer fabric 900 of the present embodiments may be made of polymer fibers 950 that include embedded nanoparticles of two different metals.

As shown in the expanded view 970, the metal nanoparticles 911-912 may be embedded in the polymer fibers 950. The metal nanoparticles 911-912, in some embodiments, may be embedded in by force, by mixing, and/or by spraying over the polymer fibers during the manufacturing of the polymer fibers. In some embodiments, the nanoparticles 911-912 may be embedded in the polymer fibers by force, for example, by punching. In some embodiments, the nanoparticles 911-912 may be embedded in the polymer fibers by mixing the nanoparticles with the synthetic material that are used to make the polymer fibers. In some embodiments, the nanoparticles 911-912 may be embedded in the polymer fibers by passing the polymer fibers during manufacturing when the polymer fibers are still hot through one or more chambers. The nanoparticles may be inserted as vapor, or a cloud, into the chambers to deposit a layer of nanoparticles over the polymer fibers. In some embodiments, the nanoparticles of the two different metals may simultaneously be inserted in the chambers. In other embodiments, the nanoparticles of each metal may be inserted in the chambers at separate stages (e.g., at different times or in separate chambers).

Depending on the type of the metals selected and whether during the manufacturing the nanoparticles are mixed with the fiber material before the fibers are formed or sprayed over the surface of the fibers after the fibers are formed, the fabric 900 may be made such that a percentage of the fabric weight may be made of the metal nanoparticles. The concentration of the added nonhomogeneous nanoparticle matter of the two metals, in some embodiments may be 0.01% to 5% of the total weight of the fabric, while the base polymer material may make the rest of the fabric weight. For example, and without limitations, at least 1% of the fabric 950 weight, in some embodiments, may be made of the first metal nanoparticle and at least 1% of the fabric 950 weight may be made of the second metal nanoparticle. In other embodiments, 0.01% of the fabric 950 weight may be made of the first metal nanoparticle and at least 0.01% of the fabric 950 weight may be made of the second metal nanoparticle.

Figure 10:
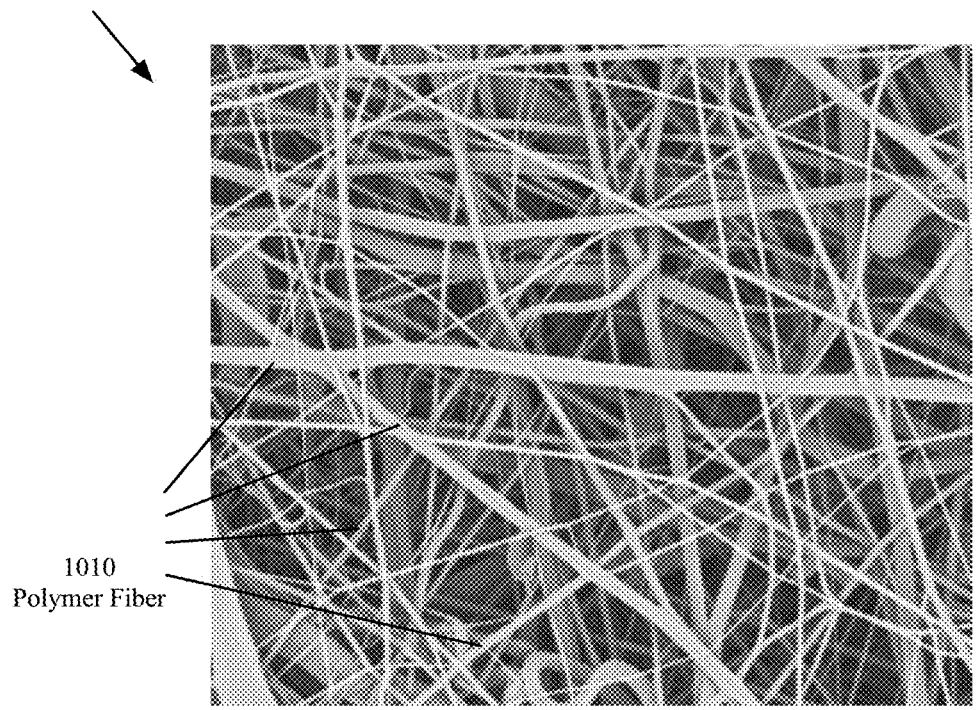
FIG. 10 is a cross-sectional view of a non-woven polymer fabric, according to prior art.

FIG. 10 is a cross-sectional view of a non-woven polymer fabric, according to prior art. As shown, the non-woven polymer fabric 1000 is made of polymer fibers 1010 that may be made of synthetic chemicals (e.g., from petrochemical sources). The polymer fibers 1010 may be made of, for example, and without limitations, polyester, polypropylene, etc.

Figure 11:
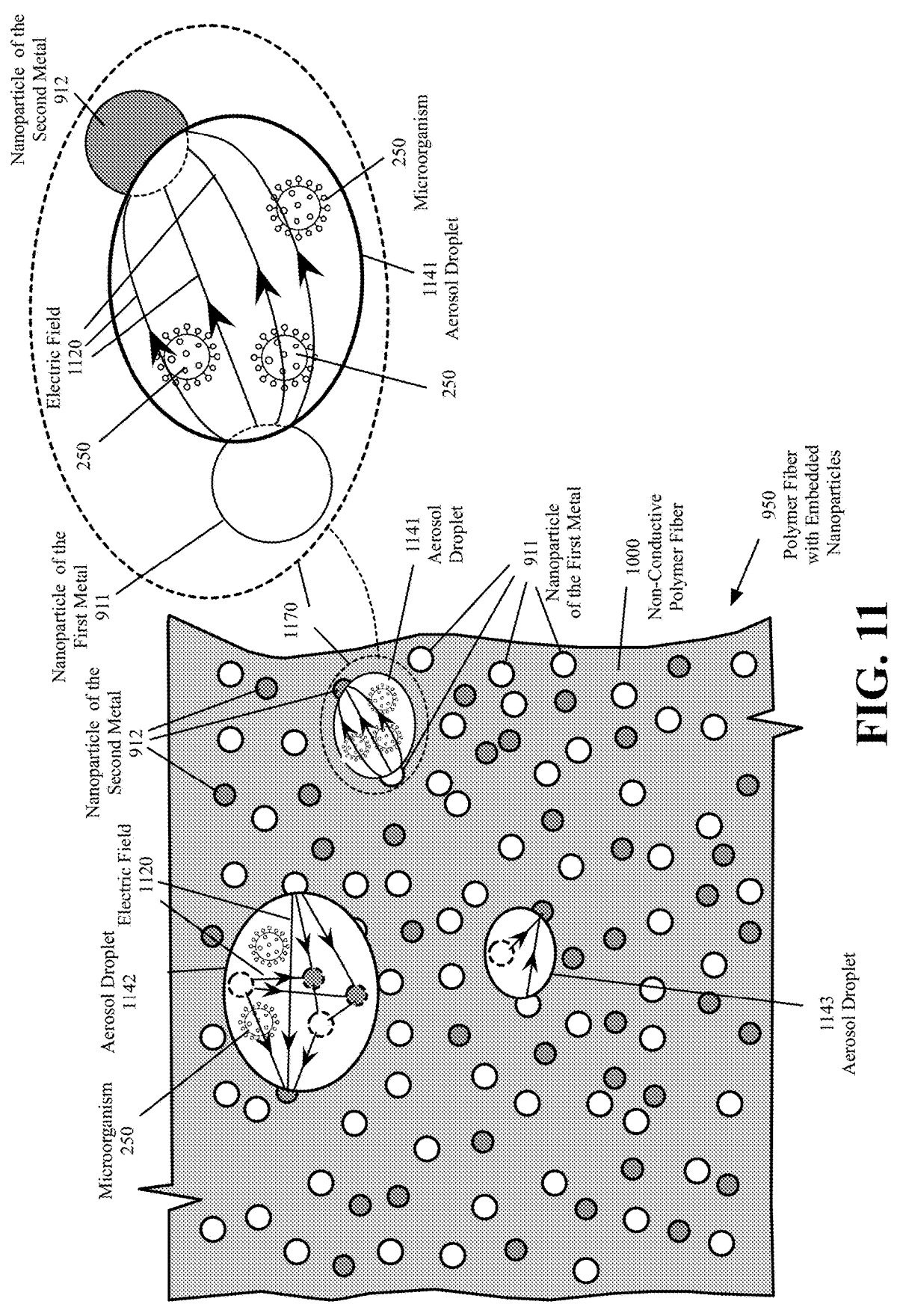

FIG. 11 is a front view of a portion of a non-conductive polymer fiber embedded with nanoparticles of two different metals, according to various aspects of the present disclosure. FIG. 11 illustrates a nonconductive polymer fiber 950 that is embedded with nanoparticles 911 and 912 of two different metals. Nanoparticles are particles of matter that are between 1 to 100 nanometers. As described above, the nanoparticles may be embedded in a non-conductive polymer fiber 1000 during the manufacturing of the polymer fiber to make the polymer fiber with the embedded nanoparticles 950.

Figure 12:
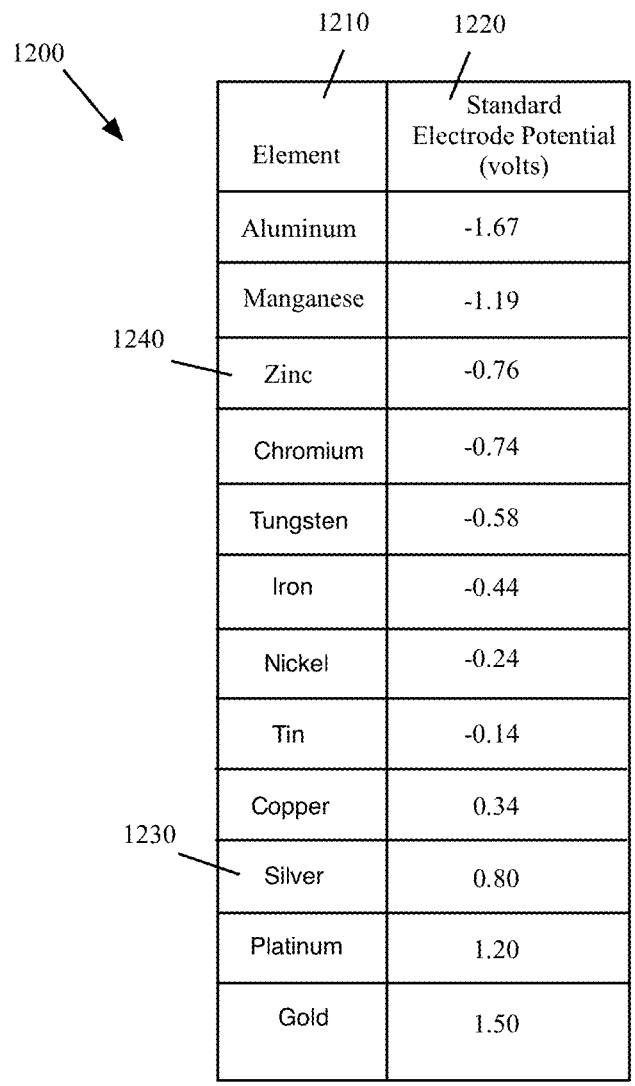
FIG. 12 shows examples of the metals that may be selected to generate the first and second metal nanoparticles, according to various aspects of the present disclosure.

FIG. 12 shows examples of the metals that may be selected to generate the first and second metal nanoparticles, according to various aspects of the present disclosure. The table 1200 shows examples of the elements 1210 that may be used to generate the nanoparticles of the present elements and the corresponding standard electrode potential 1220 of each element. The elements 1210, or a compound of the elements 1210 (e.g., an oxide of the elements 1210), may be used to generate the nanoparticles of the present embodiments. For example, when silver-oxide 1230 is selected as the first metal and zinc 1240 is selected as the second metal, a nanoparticle of silver-oxide and a nanoparticle of zinc may generate an electric field of 1.56 volts (the difference between 0.80 volts and −0.76 volts) between them when the two nanoparticles are connected by an alkaline electrolyte solution that may contain ions of elements such as sodium and chlorine.

In addition to metal elements 1210 shown in the table 1200, some embodiments may use additional non-metal elements, for example, and without limitations, carbon, which has a standard electrode potential of 0.5 volts. For instance, nanoparticles of zinc and carbon may generate an electric field of 1.26 volts (the difference between 0.50 volts and −0.76 volts).

Referring back to FIG. 11, when an electrolyte, such as an aerosol droplet 1141-1143, comes into contact with the nanoparticles of the first metal 911 and the nanoparticles of the second metal 912 a nano cell (or nano battery) may be generated. The electric field 1120 generated between the nanoparticles of the first and second metals may inactivate any microorganisms 250 in the aerosol droplet 1141-1143. The aerosol droplets may be generated when a person coughs, sneezes, and/or breathes. The aerosol droplets may remain airborne for extended periods of time and may carry microorganisms that may be inhaled.

The aerosol droplets (such as respiratory, or cough droplets) 1141-1143 are suspensions of fine particles that may be less than 50 micrometers, and in most instances less than 5 micrometers, in size. For example, the paper by Yang, Shinhao, et al., "The Size and Concentration of Droplets Generated by Coughing in Human Subjects," Journal of Aerosol Medicine, Volume 20, Number 4, February 2007, pp 484-494 provides the average size distribution of droplets generated by coughing, when the subjects directly cough in a sample bag, as 0.62-15.9 micrometer. The mode (the number that occurs most often in a data set) of the cough drop sizes was 8.35 micrometer and the geometric standard deviation was 2.205. The size distribution of the cough droplet had three peaks at approximately 1 micrometer, 2 micrometers, and 8 micrometers. The contents of this paper is herein incorporated by reference in its entirety.

As shown in the expanded view 1170, an electric field 1120 may be generated through the droplet 1141 between a nanoparticle of the first metal 911 and a nanoparticle of the second metal 912. Since the nanoparticles do not have an active power source (such as the power source 130 of FIGS. 1A-1B), the nanoparticles of the two metals have to be connected by an electrolyte (e.g., the liquid inside an aerosol droplet) in order to generate an electric field 1120. When the aerosol droplet comes in contact with multiple nanoparticles of the first and second metal (e.g., as shown by the aerosol droplets 1142 and 1143) an electric field 1120 may be generated between each pair of nanoparticles of the first and second metals.

The two different metals may be selected such that the difference between their standard electrode potential 1220 (FIG. 12) is larger than a threshold. For example, and without limitations, when the threshold is 1.5 volts, zinc and silver (1.56 volts difference), zinc and gold (2.26 volts difference), iron and gold (1.94 volts difference), etc., may be selected as the two different metals.

It should be noted that it is the electric field intensity generated between the nanoparticles of the two different metal through the aerosol particle that inactivates the microorganisms that may be inside the aerosol particle. The maximum of the electric field intensity occurs midway between the neighboring nanoparticles of two different metals connected by an aerosol droplet, such as the nanoparticles 911 and 912 of FIG. 11 that are connected by the aerosol droplet 1141, may be shown by Equation 1:

$$E = \frac{(v1 - v2)}{\frac{d}{2}} \qquad \text{Eq. (1)}$$

where E is the electric field intensity between the two nanoparticles; v1 and v2 are the standard electrode potentials of the first and second metals, respectively; and d is the distance between the two nanoparticles.

As an example, when the two different metals are zinc and silver and the distance between a zinc nanoparticle and a silver nanoparticle is 2 micrometer (or 2 micron), the electric intensity generated by the two nanoparticles through an aerosol particle may be calculated as shown in Equation (2):

$$E = 2 * \frac{1.56}{2 * 10^{-6}} = 1.56 * 10^6 \text{ v/m} = 15.6 \text{ kv/cm} \qquad \text{Eq (2)}$$

where v, m, kv, and cm are volts, meter, kilovolts, and centimeter.

As second example, when the two different metals are zinc and silver and the distance between a zinc nanoparticle and a silver nanoparticle is 0.5 micrometer (or 500 nanometers), the electric intensity generated by the two nanoparticles through an aerosol particle may be calculated as shown in Equation (3):

$$E = 2 * \frac{1.56}{0.5 * 10^{-6}} = 6.24 * 10^6 \text{ v/m} = 62.4 \text{ kv/cm} \quad \text{Eq (3)}$$

As third example, when the two different metals are zinc and silver and the distance between a zinc nanoparticle and a silver nanoparticle is 0.3 micrometer (or 300 nanometers), the electric intensity generated by the two nanoparticles through an aerosol particle may be calculated as shown in Equation (4):

$$E = 2 * \frac{1.56}{0.3 * 10^{-6}} = 15.6 * 10^6 \text{ v/m} = 104 \text{ kv/cm} \quad \text{Eq (4)}$$

As fourth example, when the two different metals are zinc and gold and the distance between a zinc nanoparticle and a gold nanoparticle is 0.25 micrometer (or 250 nanometers), the electric intensity generated by the two nanoparticles through an aerosol particle may be calculated as shown in Equation (5):

$$E = 2 * \frac{2.26}{0.25 * 10^{-6}} = 18.08 * 10^6 \text{ v/m} = 180.8 \text{ kv/cm} \quad \text{Eq (5)}$$

As shown in Equation (1), the electric field intensity, E, between the two nanoparticles increases as the difference between the standard electrode potentials, v1-v2, increases and the distance, d, between the two nanoparticles decreases. Furthermore, as shown in Table 1200 (FIG. 12), the maximum difference between the standard electrode potential shown in the table is 3.17 volts when the two different metals are aluminum and gold. It is, therefore, desirable to increase the electric field intensity by reducing the distance between two adjacent nanoparticles.

Some embodiments configure the population density of the nanoparticles such that the average distance between two adjacent nanoparticles on the surface of the polymer fibers is less than a threshold distance. The population density of the nanoparticles may be configured based on the percentage of the weight of each type of nanoparticle in the total fabric weight. An example of how the percentage of weight of the nanoparticles in the total weight of the fabric may determine the average distance between the nanoparticles on the surface of the fabric is provided below.

Assuming a 0.01% total weight of the fabric for each of the two types of nanoparticles, the total percentage of the nanoparticle weight in the fabric is 0.02%. The following assumptions are made herein to simplify the calculations: The nanoparticles are uniformly distributed over the fabric fibers. The nanoparticles shape is assumed to be spherical and the fibers shape is assumed to be cylindrical. The average diameter of the fibers is assumed to be 20 micrometers (um). The average diameter of the nanoparticles is assumed to be 20 nanometer (nm). The specific gravity of silver is assumed to be 10.5 grams (g) per cubic centimeter ($cm^3$) and the specific gravity of zinc is assumed to be 7.13 $g/cm^3$. The specific gravity of the nanoparticles, may therefore, be averaged to 10 grams per cubic centimeters for simplicity.

The paper by Payen, Julien, et al, "Influence of fiber diameter, fiber combinations and solid volume fraction on air filtration properties in nonwovens," Textile Research Journal, June 2012, pp. 1948-1959 provides the following ranges. The contents of this paper is herein incorporated by reference in its entirety. The fiber diameter has a range of 10-45 um. A diameter of 20 um is used herein to perform calculations. The basis length range of the fibers is from 250 to 2400 kilometers (km) per square meter ($m^2$). The basis weight range of the fibers is from 150 to 300 $g/m^2$.

The total surface area of the fibers available for nanoparticle deposit may be calculated as follows. The surface area, A, of a cylinder with a length of L and a radius of r is calculated by Equation (6):

$$A=2\pi*r*L+2\pi*r^2 \quad \text{Eq (6)}$$

Given the low range value of 250 $km/m^2$ for the basis length, the area is calculated as shown Equations (7) to (10).

$$A=2\pi*(10\text{ um})*(250\text{ km})+2\pi*(10\text{ um})^2 \quad \text{Eq (7)}$$

Therefore, $$A=2\pi*(10*10^{-6}\text{ m})*(250*10^3\text{ m})+2\pi*(10*10^{-6}\text{ m})^2 \quad \text{Eq (8)}$$

Ignoring the second, much smaller term, the surface area, A, may be calculated in meters as follows.

$$A=2\pi*(2500*10^{-3}) \quad \text{Eq (9)}$$

For the low end value of 250 km per $m^2$ for the basis length range, the surface area, A, is calculated as follows.

$$A=2\pi*(2.5\text{ m}^2)=15.7\text{ m}^2 \text{ per m}^2 \text{ of fiber media.} \quad \text{Eq (10)}$$

For the high end value of 2400 km per $m^2$ for the basis length range, the surface area, A, is calculated as shown in Equation (11):

$$A=2\pi*(240\text{ m}^2)=1507\text{ m}^2 \text{ per m}^2 \text{ of fiber media.} \quad \text{Eq (11)}$$

Assuming a weight of 150 grams per square meter of fabric and a 0.02% weight of nanoparticles, the nanoparticles weights would be 150*0.0002, or 0.03 grams per square meter. As the specific gravity of the nanoparticles is assumed to be 10 grams per $cm^3$ or $10*10^6$ grams per $m^3$. The volume, V, of a sphere with a radius of r is calculated as shown in Equation (12):

$$V=4/3\pi*r^3 \quad \text{Eq (12)}$$

The average volume of a nanoparticle is therefore calculated as shown in Equation (13):

$$V=4/3\pi*(10\text{ nm})^3=4/3\pi*(10^{-26})\text{m}^3=4*10^{-26}\text{ m}^3 \quad \text{Eq (13)}$$

Using the specific gravity of the nanoparticles and the weight of the nanoparticles the volume, Vnp, of nanoparticles may be calculated as shown in Equation (14):

$$Vnp=0.03\text{ grams}/10*10^{-26}\text{ grams/m}^3=0.03/10^5\text{ m}^3=3/10^{-5}\text{ m}^3 \quad \text{Eq (14)}$$

The total number of nanoparticles, N, may be calculated as shown in Equations (15)-(16):

$$N=\text{Total volume of nanoparticle/volume of each nanoparticle} \quad \text{Eq (15)}$$

$$N=0.03*10^{-5}\text{ m}^3/4*10^{-26}=3/4*10^{19}\text{ nanoparticles} \quad (16)$$

The distribution of nanoparticles over the fiber surface may, therefore, be calculated as shown in Equations (17)-(18):

High end of fiber area=$2\pi(240\ m^2)=1507\ m^2$ per $m^2$ of fiber media (17)

High end of fiber area=$1507\ m^2=1507*10^{18}\ nm^2=1.5*10^{21}$ (18)

Given the total particle number of $10^{18}$ and the approximate fiber area of $1.5*10^{21}$, the population density of nanoparticles would be 1.5 nanoparticle per 100 $nm^2$, or the average distance between two adjacent nanoparticles would be 150 nm. Since half of the particles are of the same type, the average distance between two adjacent nanoparticles of different metal may be 300 nm. When the two metals are zinc and silver and the average distance between two nanoparticles of different metal may be 300 nm, Equation (4), above, provides an electric field intensity of 105 kv/cm when the two nanoparticles are connected by an aerosol particle. Studies have shown that a fraction of this electric field intensity may inactivate microorganisms. For example, the paper by Yao, Maosheng, et al., "Inactivation of microorganisms using electrostatic fields," Environ Sci Technol., May 2005, Abstract, provides the following research results for inactivation of microorganisms. More than 90% of microorganisms were inactivated when fields of 15 kv/cm were applied for 30 minutes or longer. Similar results were observed when microorganisms were exposed to fields of 5 and 10 kv/cm for 2 hours. The contents of this paper is herein incorporated by reference in its entirety. Accordingly, an electric field intensity of 105 kv/cm is enough to inactivate microorganisms that may come in contact with the masks of the present embodiments.

Controlling the population density of the nanoparticles based on the percentage of the weight of each type of nanoparticle in the total fabric weight provides the technical advantage of configuring the average distance between the nanoparticles during the manufacturing of the fabric 950. For example, the average distance of the nanoparticles may be configured such that an aerosol droplet, such as a cough droplet, that comes in contact with the masks and PPEs of the precent embodiments may come in contact with one or more pairs of nanoparticles of different metals (e.g., as shown for droplets 1141-1143 of FIG. 11) resulting in one or more nano batteries that may inactivate the microorganisms inside the aerosol droplet.

In some embodiments, the percentage of the weight of the nanoparticles 911-912 that is required to ensure the average distance between two adjacent nanoparticles on the surface of the polymer fibers 950 is less than a threshold distance may be confirmed by a series of experimentations to account for particle loss during manufacturing process (e.g., when a portion of the vaporized nanoparticles may not be deposited over the surface of the fiber).

Figure 9:
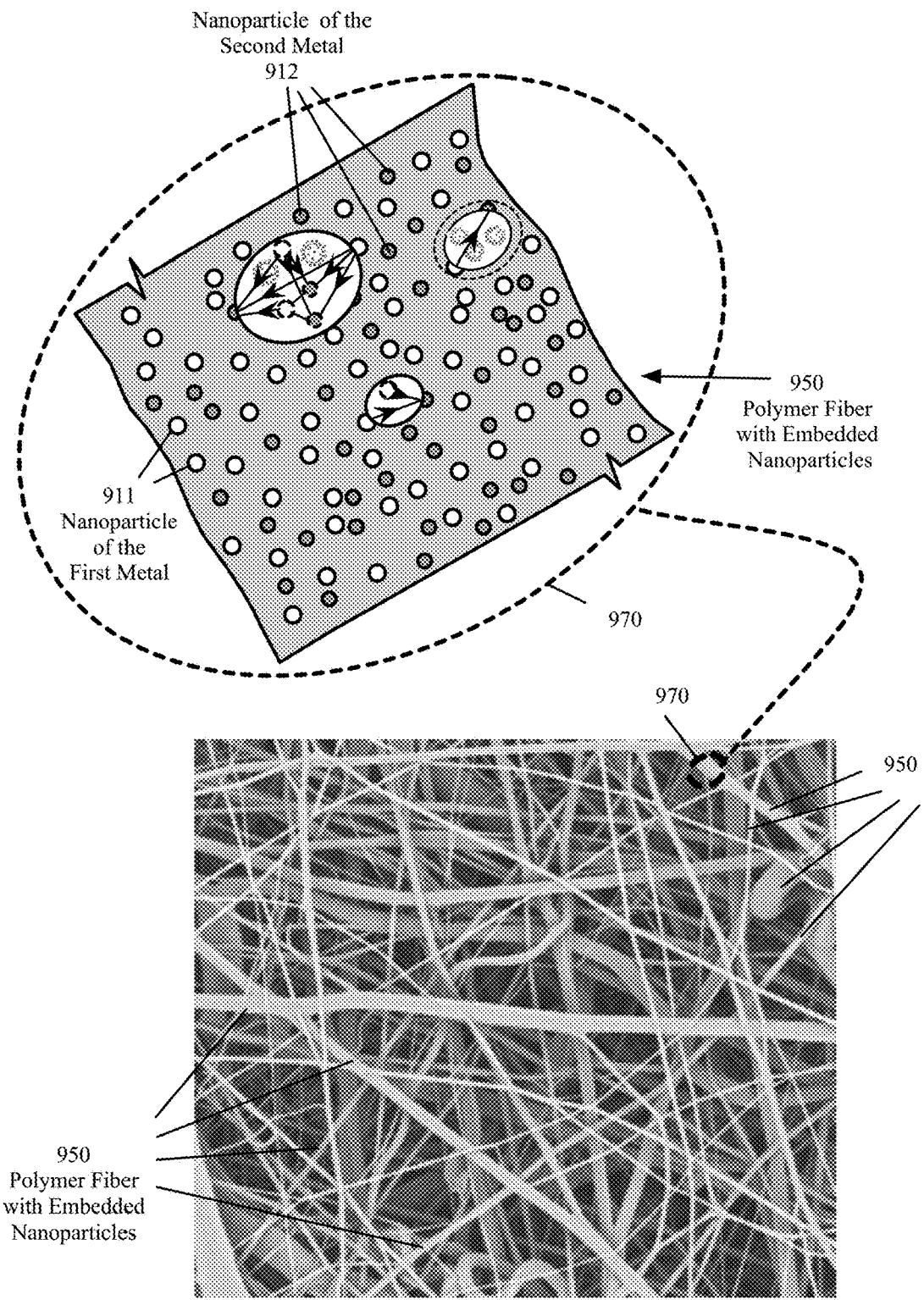
FIG. 9 is a cross-sectional view of a non-woven polymer fabric with polymer fibers that are embedded with nanoparticles of two different metals, according to various aspects of the present disclosure.
Figure 13:
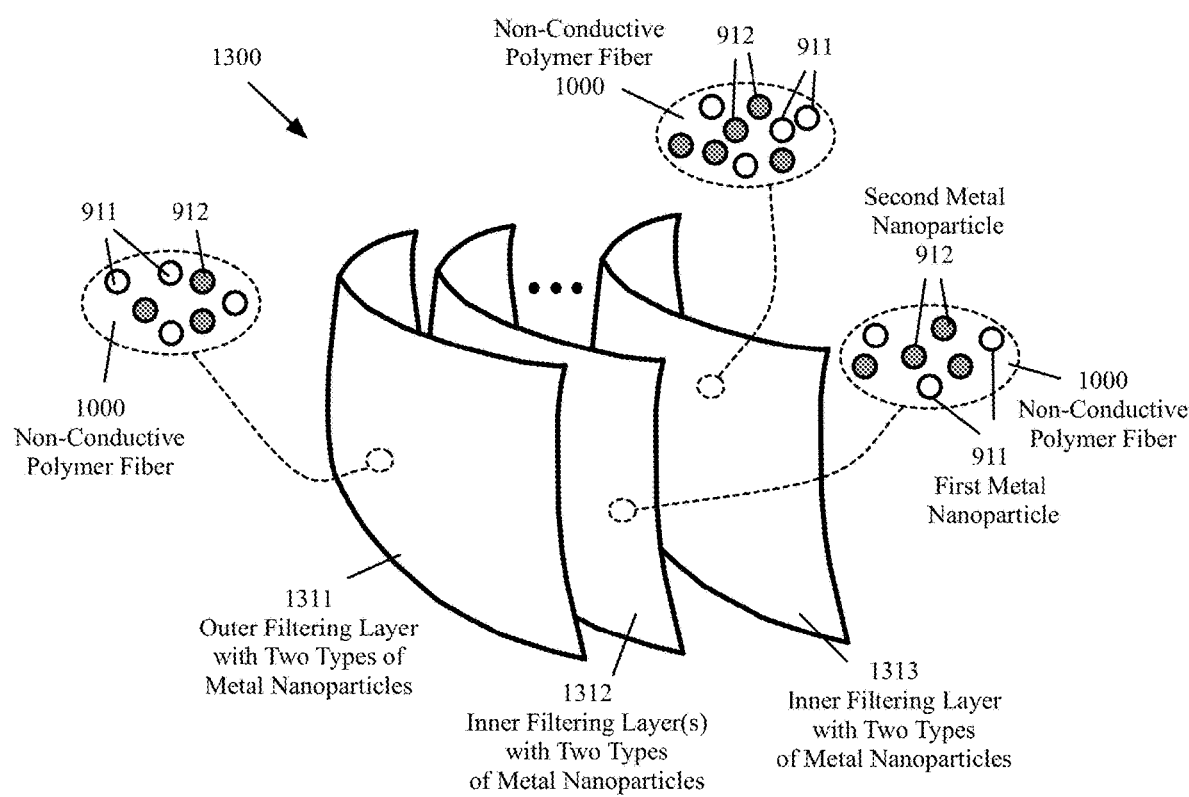
FIG. 13 is a perspective view of a multi-layer respirator that includes one or more filtering layers with polymer fibers embedded with nanoparticles of two different metals, according to various aspects of the present disclosure.

The polymer fabric with the embedded nanoparticles 950 of FIGS. 9 and 11 may be used to make a protective mask that may inactivate microorganisms. FIG. 13 is a perspective view of a multi-layer respirator that includes one or more filtering layers with polymer fibers embedded with nanoparticles of two different metals, according to various aspects of the present disclosure. With reference to FIG. 13, the mask 1300 may include several filtering layers 1311-1313. In the example of FIG. 13, all filtering layers 1311-1313 include two different metal nanoparticles 911-912. In other embodiments, the mask 1300 may include one or more filtering layers with the nanoparticles 911-912 and one or more filtering layers without the nanoparticles 911-912.

The number of filtrating layers 1311-1313 may be configured to meet different mask or respirator standards. For example, the mask 1300 may be configured to include five filtrating layers 1311-1313 with similar filtering material as the N95, KN95, or FFP2 respirators to conform with different standard for the respirators. The mask 1300 may be configured to include three filtrating layers 1311-1313 with similar filtering material as a standard surgical mask. The mask 1300 may include a plurality of fasteners (not shown) configured to attach the mask to a face of a wearer such that the mask covers the wearer's mouth and at least a part of the wearer's nose, and respiration air is drawn through the filtering layers 1311-1313. The mask 1300 of the present embodiments has the technical advantage over the standard respirators/surgical masks of providing the additional protection of the electric fields generated by the nanoparticles 911-912 that may inactivate microorganisms inside aerosol droplets.

It should be noted that some metals, such as silver, have been known to have antimicrobial effects. In the past, some of the fabric used in the masks and respirators included nanoparticles of a metal, such as silver to provide additional antimicrobial effects. The masks and respirators of the present embodiments provide the technical advantage of using fabrics that include nanoparticles of two different metals, and the nanoparticles are embedded in and/or sprayed over the non-woven polymer fibers such that the nanoparticles of the two different mentals may be connected by aerosol droplets to form a nano cell (or nano battery). The electric field generated by the nano cell between the nanoparticles of the first and second metals may inactivate any microorganisms in the aerosol droplet.

As described above, the present embodiments provide a polymeric fabric for a mask or respirator, which includes non-homogeneous nanoparticle material (e.g., such as silver and copper) as described above in the range of 5-200 nanometers, where the spun diameter of the nanofibers of the manufactured final polymer, such as nylon, polyester or polypropylene may be in the range of 100 to 1000 nanometers. The concentration of the added nonhomogeneous nanoparticles referenced above may be in the range of 0.2 to 5% weight of the base polymer material. The multilayer filtration media of the mask/respirators of the present embodiments is constructed to provide at least 95% aerosol particle reduction/deactivation at 0.3 micrometers diameter.

Figure 14:
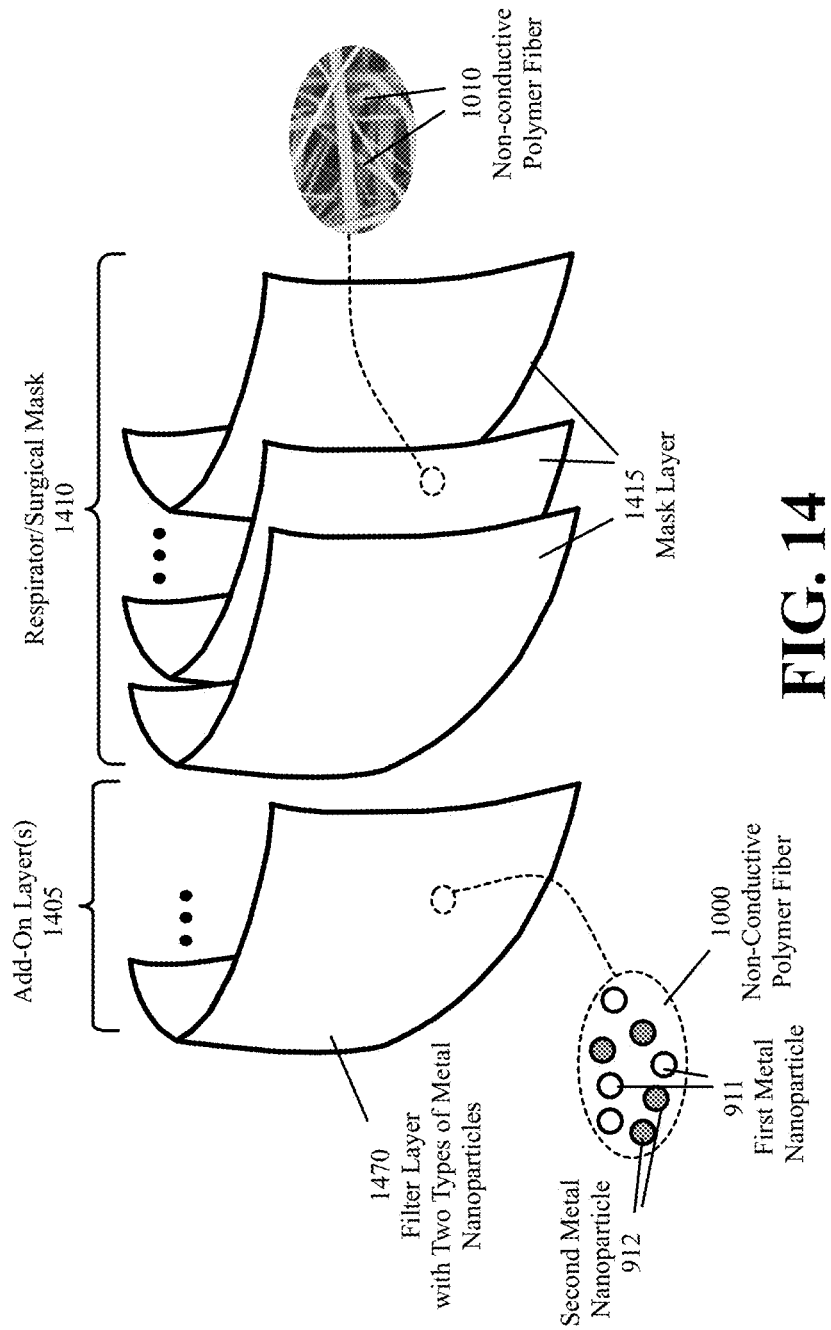
FIG. 14 is a perspective view of a respirator with one or more filtering layers made of polymer fibers embedded with nanoparticles of two different metals, which may be worn over a respirator or a surgical mask, according to various aspects of the present disclosure.

The masks with nanoparticles, in some embodiments, may be worn as an add-on to a respirator or a surgical mask. FIG. 14 is a perspective view of a respirator with one or more filtering layers made of polymer fibers embedded with nanoparticles of two different metals, which may be worn over a respirator or a surgical mask, according to various aspects of the present disclosure. With reference to FIG. 14, the respirator 1405 with one or more filtering layers made of polymer fibers embedded with nanoparticles of two different metals may be worn as an add-on over a respirator or a surgical mask 1410.

The number of layers 1415 of the respirator or a surgical mask 1410 may be selected to conform to any of the respirator or surgical mask standards indicated above. In addition, the number of filtering layer(s) 1470 of the add-on layer(s) 1405 may be kept at a minimum (e.g., at one or two) to maintain the flow of air into the respirator/surgical mask 1410. The system 1400 of FIG. 14 has the technical advantage over the standard respirators/surgical masks of providing the additional protection of the electric fields generated by the nanoparticles 911-912 of two different metals that may inactivate (as described above) microorganisms inside aerosol droplets.

Figure 15:
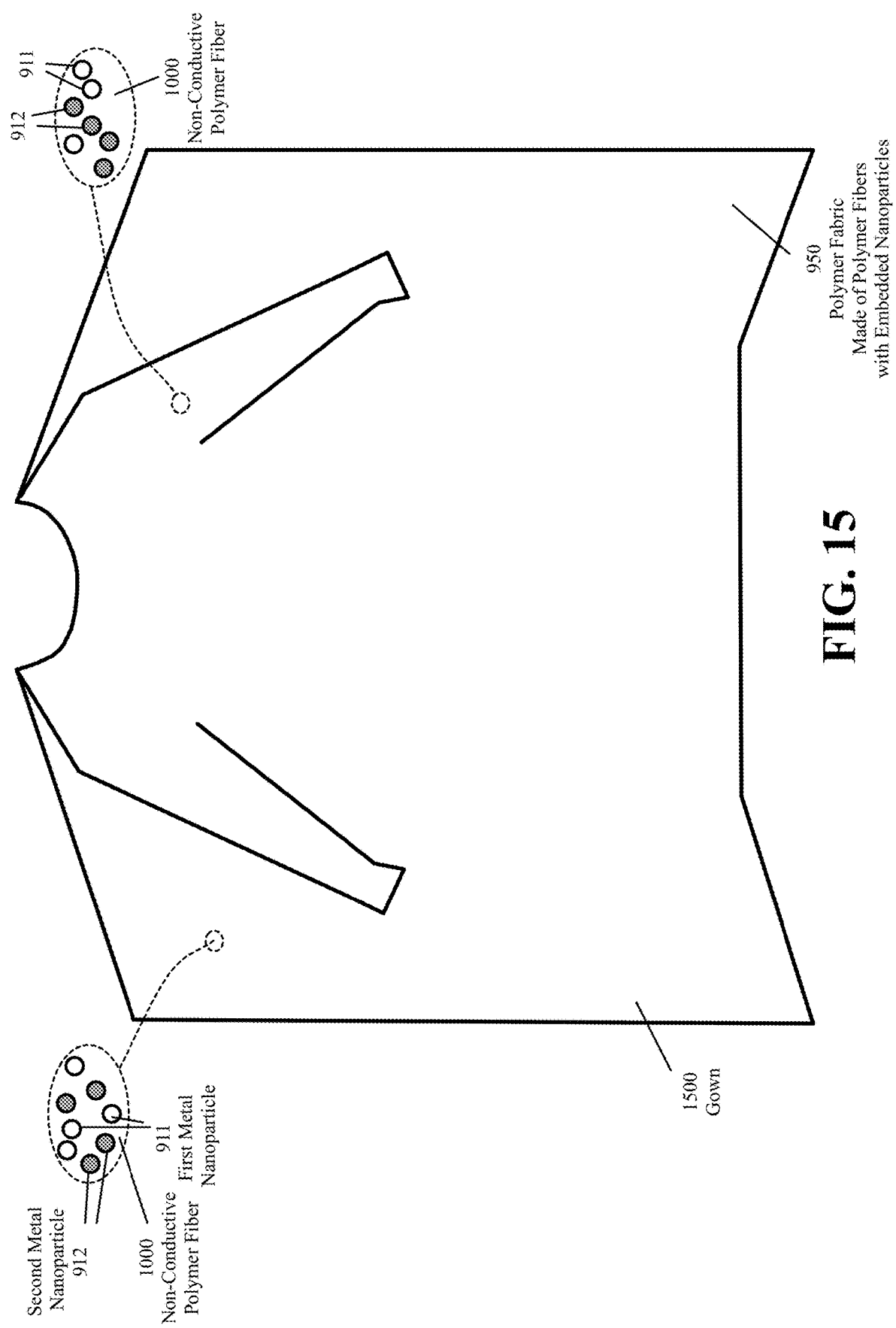
FIG. 15 is a front view of gown made of a fabric with polymer fibers that are embedded with nanoparticles of two different metals, according to various aspects of the present disclosure.

The polymer fabric 950 made of polymer fibers with embedded nanoparticles of the present embodiments may be used in other PPE, such as, for example, and without limitations, gowns, footwear covers, etc. FIG. 15 is a front view of a gown made of a fabric with polymer fibers that are embedded with nanoparticles of two different metals, according to various aspects of the present disclosure. With reference to FIG. 15, the gown 1500 may be made of a polymer fabric 950 with polymer fibers embedded with nanoparticles of two different metals 911-912, as described above with reference to FIG. 9.

The polymer fibers 1000 in the polymer fabric 950 may be made of a material such as, for example, and without limitations, non-woven polyester fiber, non-woven polypropylene, etc., to conform with one or more standards for the PPE clothing.

Figure 16:
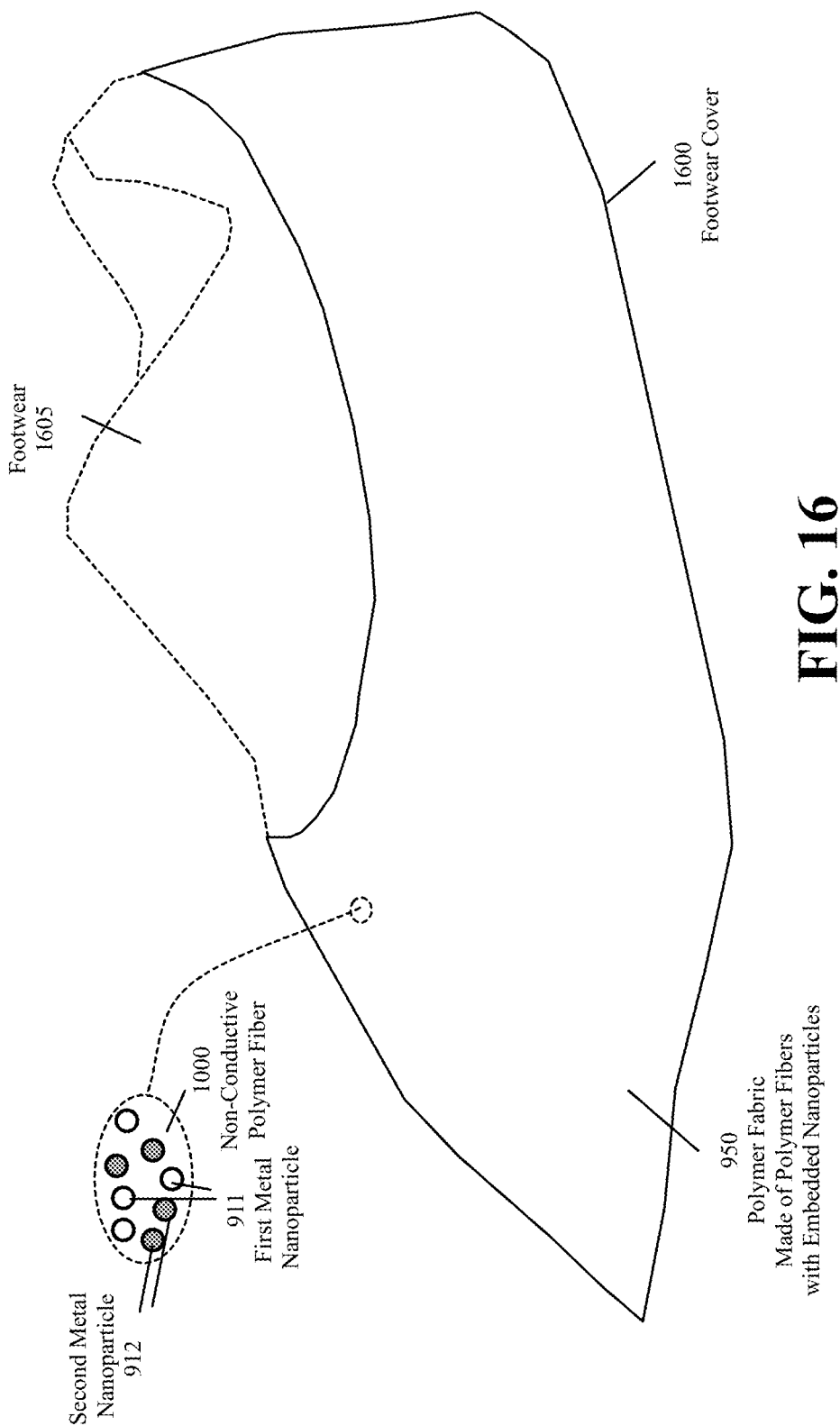
FIG. 16 is a perspective view of a footwear cover made of a fabric with polymer fibers that are embedded with nanoparticles of two different metals, according to various aspects of the present disclosure.

FIG. 16 is a perspective view of a footwear cover made of a fabric with polymer fibers that are embedded with nanoparticles of two different metals, according to various aspects of the present disclosure. With reference to FIG. 16, the footwear cover 1600 may be made of a polymer fabric 950 with polymer fibers embedded with nanoparticles of two different metals 911-912, as described above with reference to FIG. 9. The footwear cover 1600 may be worn over a footwear 1605 such as a shoe.

The polymer fibers 1000 in the polymer fabric 950 may be made of a material such as, for example, and without limitations, non-woven polyester fiber, non-woven polypropylene, etc., to conform with one or more standards for the PPE clothing.

The PPEs of FIGS. 15 and 16, such as, for example, and without limitations, gowns, footwear covers, have the technical advantage over the standard PPEs of providing the additional protection of the electric fields generated by the nanoparticles 911-912 of two different metals that may inactivate (as described above) microorganisms inside aerosol droplets.

Figure 17A:
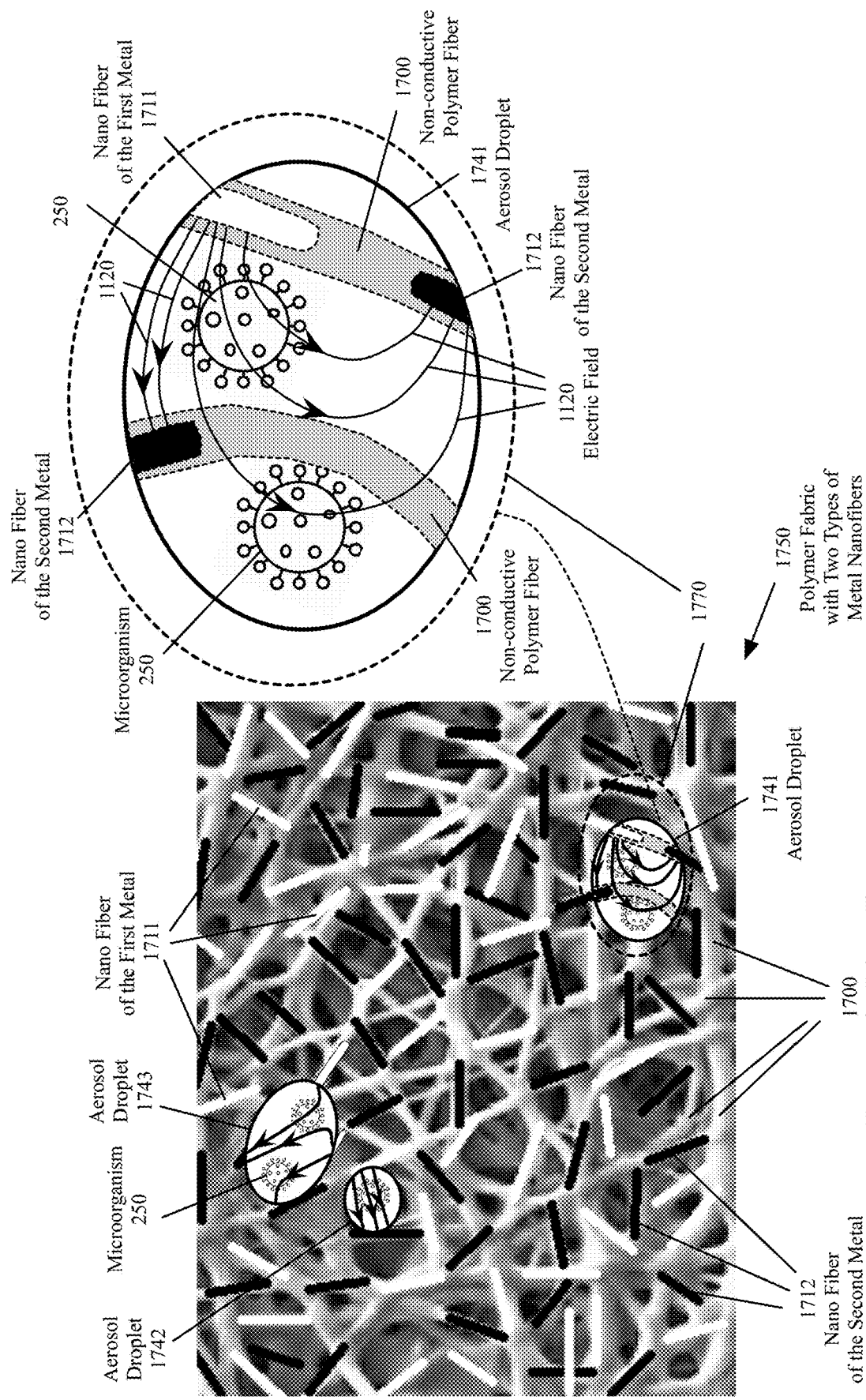
FIG. 17A is a cross sectional view of a fabric made of a non-conductive polymer fiber embedded with nanofibers of two different metals, according to various aspects of the present disclosure.

III. Personal Protective Equipment with Nanofibers of Two Different Metals to Inactivate Microorganisms Some embodiments may use fabrics made of non-conductive synthetic fibers mixed with two different types of metal nanofibers that may generate an electric field in the presence of an aerosol droplet. FIG. 17A is a cross sectional view of a fabric made of a non-conductive polymer fiber embedded with nanofibers of two different metals, according to various aspects of the present disclosure.

With reference to FIG. 17A, the fabric 1750 may be made of non-conductive polymer fibers 1700 embedded with a first metal nanofiber 1711 and a second metal nanofiber 1712. The non-conductive polymer fibers 1700, for example, and without limitations, may be made of non-woven polyester fibers or polypropylene fibers.

The non-conductive polymer fibers 1700 and the metal nanofibers 1711-1712 in FIG. 17 are not shown to scale for clarity. For example, the non-conductive polymer fabric may have a thickness of between 50 to 200 micrometers, where the spun diameter of the nanofibers of the manufactured final polymer, such as nylon, polyester or polypropylene may be in the range of 100 to 1000 nanometers. The metal nanofibers may be fibers with diameters in the nanometer range (e.g., and without limitations 5-200 nanometers). The multilayer filtration media of the present embodiments may be constructed to provide at least 95% aerosol particle reduction at 0.3 micrometers particle diameter.

Figure 17B:
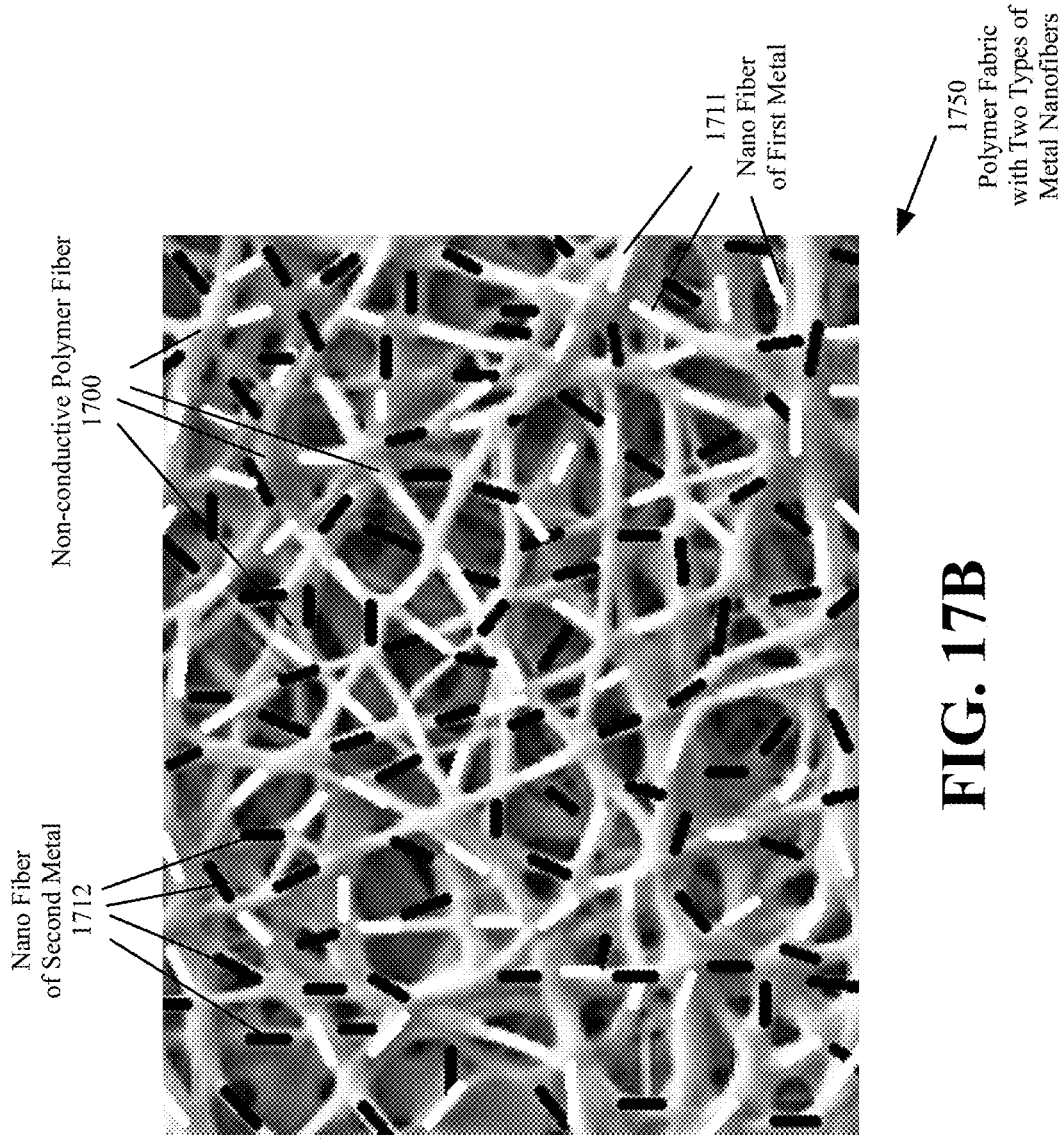
FIG. 17B is a cross sectional view of a fabric made of a non-conductive polymer fiber embedded with nanofibers of two different metals, where the metal nanofibers are shorter than the metal nanofibers of FIG. 17A, according to various aspects of the present disclosure.

The metal nanofibers 1711-1712 may be mixed with the non-conductive polymer fibers at manufacturing time. The length of the metal nanofibers 1711-1712 may be shorter than the length of non-conductive polymer fibers 1700. Different embodiments may include different lengths of metal nanofibers 1711-1712. FIG. 17B is a cross sectional view of a fabric made of a non-conductive polymer fiber embedded with nanofibers of two different metals, where the metal nanofibers are shorter than the metal nanofibers of FIG. 17A, according to various aspects of the present disclosure.

The first and second metals for making the metal nanofibers 1711-1712 may, for example, be selected from the elements listed in table 1200 (FIG. 12). Depending on the type of the metals selected, the fabric 1750 may be made such that a percentage of the fabric weight may be made of the first and second metal nanofibers. The concentration of the added nonhomogeneous nanofibers matter, in some embodiments may be 0.01% to 5% total weight of the fabric, while the base polymer material may make the rest of the fabric weight. For example, and without limitations, at least 1% of the fabric 1750 weight, in some embodiments, may be made of the first metal nanofibers and at least 1% of the fabric 1750 weight may be made of the second metal nanofibers. The multilayer filtration media of the mask/respirators of the present embodiments is constructed to provide at least 95% aerosol particle reduction/deactivation at 0.3 micrometers diameter.

Some embodiments configure the population density of the nanofibers such that the average distance between two adjacent nanofibers on the surface of the polymer fibers is less than a threshold distance. The population density of the nanofibers may be configured based on the percentage of the weight of each type of nanofibers in the total fabric weight. For example, some embodiments may use equations, such as Equations (6)-(18) described above, to determine the population density of the nanofibers based on the percentage of the weight of each type of nanofibers in the total fabric weight.

Controlling the population density of the nanofibers based on the percentage of the weight of each type of nanofibers in the total fabric weight provides the technical advantage of configuring the average distance between the nanofibers during the manufacturing of the fabric 1750. For example, the average distance of the nanofibers may be configured such that an aerosol droplet, such as a cough droplet, that comes in contact with the masks and PPEs of the precent embodiments may come in contact with one or more pairs of nanofibers of different metals (e.g., as shown for droplets 1741-1743 of FIG. 17A) resulting in one or more nano batteries that may inactivate the microorganisms inside the aerosol droplet.

With further reference to FIG. 17A, when an electrolyte, such as an aerosol droplet 1741-1743, comes into contact with the nanofibers of the first metal 1711 and the nanofibers of the second metal 1712, a nano cell may be generated. The electric field 1120 generated between the nanofibers of the first and second metals may inactivate any microorganisms 250 in the aerosol droplet 1741-1743.

As shown in the expanded view 1770, an electric field 1120 may be generated, through the droplet 1741, between a nanofiber of the first metal 1711 and a nanofiber of the second metal 1712. When the aerosol droplet is large enough to come in contact with multiple nanofibers of the first and second metal (e.g., the aerosol droplet 1741 in the expanded view 1770 comes in contact with one nanofiber of the first metal 1711 and two nanofibers of the second metal 1712) an electric field 1120 may be generated between each pair of nanofibers of the first and second metals.

Figure 18:
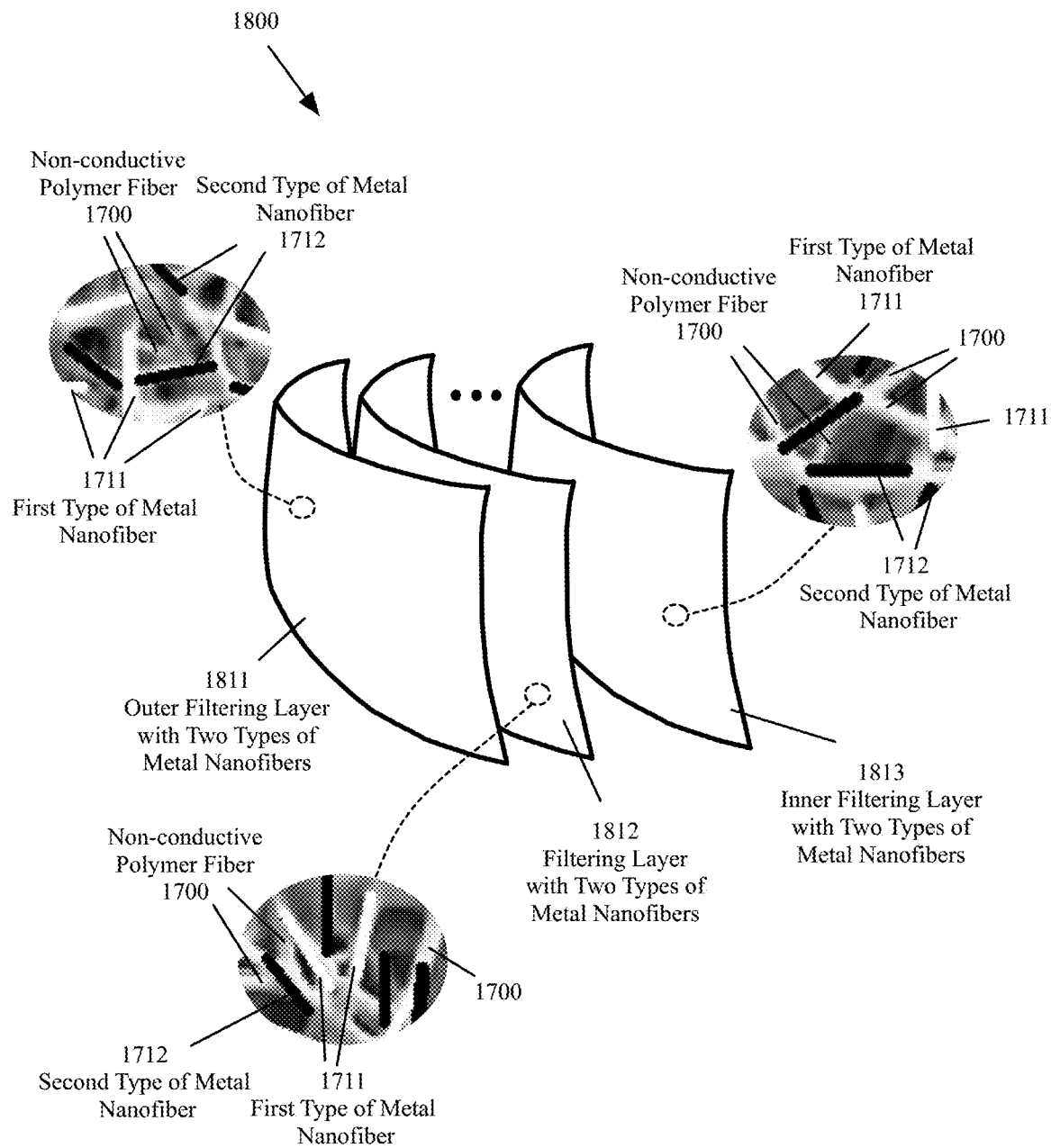
FIG. 18 is a perspective view of a multi-layer respirator that includes one or more filtering layers made of polymer fibers that are embedded with nanofibers of two different metals, according to various aspects of the present disclosure.

The polymer fabric with two types of metal nanofibers 1750 of FIGS. 17A-17B may be used to make a protective mask that may inactivate microorganisms. FIG. 18 is a perspective view of a multi-layer respirator that includes one or more filtering layers made of polymer fibers that are embedded with nanofibers of two different metals, according to various aspects of the present disclosure. With reference to FIG. 18, the mask 1800 may include several filtering layers 1811-1813. In the example of FIG. 18, all filtering layers 1811-1813 include nanofibers of two different metals 1711-1712. In other embodiments, the mask 1800 may include one or more filtering layers with the nanofibers 1711-1712 and one or more filtering layers without the nanofibers 1711-1712.

The number of filtrating layers 1811-1813 may be configured to meet different mask or respirator standards. For example, the mask 1800 may be configured to include five filtrating layers 1811-1813 with similar filtering material as the N95, KN95, or FFP2 respirators to conform with different standard for the respirators. The mask 1800 may be configured to include three filtrating layers 1811-1813 with similar filtering material as a standard surgical mask. The mask 1800 may include a plurality of fasteners (not shown) configured to attach the mask to a face of a wearer such that the mask covers the wearer's mouth and at least a part of the wearer's nose, and respiration air is drawn through the filtering layers 1811-1813. The mask 1800 of FIG. 18 has the technical advantage over the standard respirators/surgical masks of providing the additional protection of the electric fields generated by the nanofibers 1711-1712 that may inactivate microorganisms inside aerosol droplets.

Figure 19:
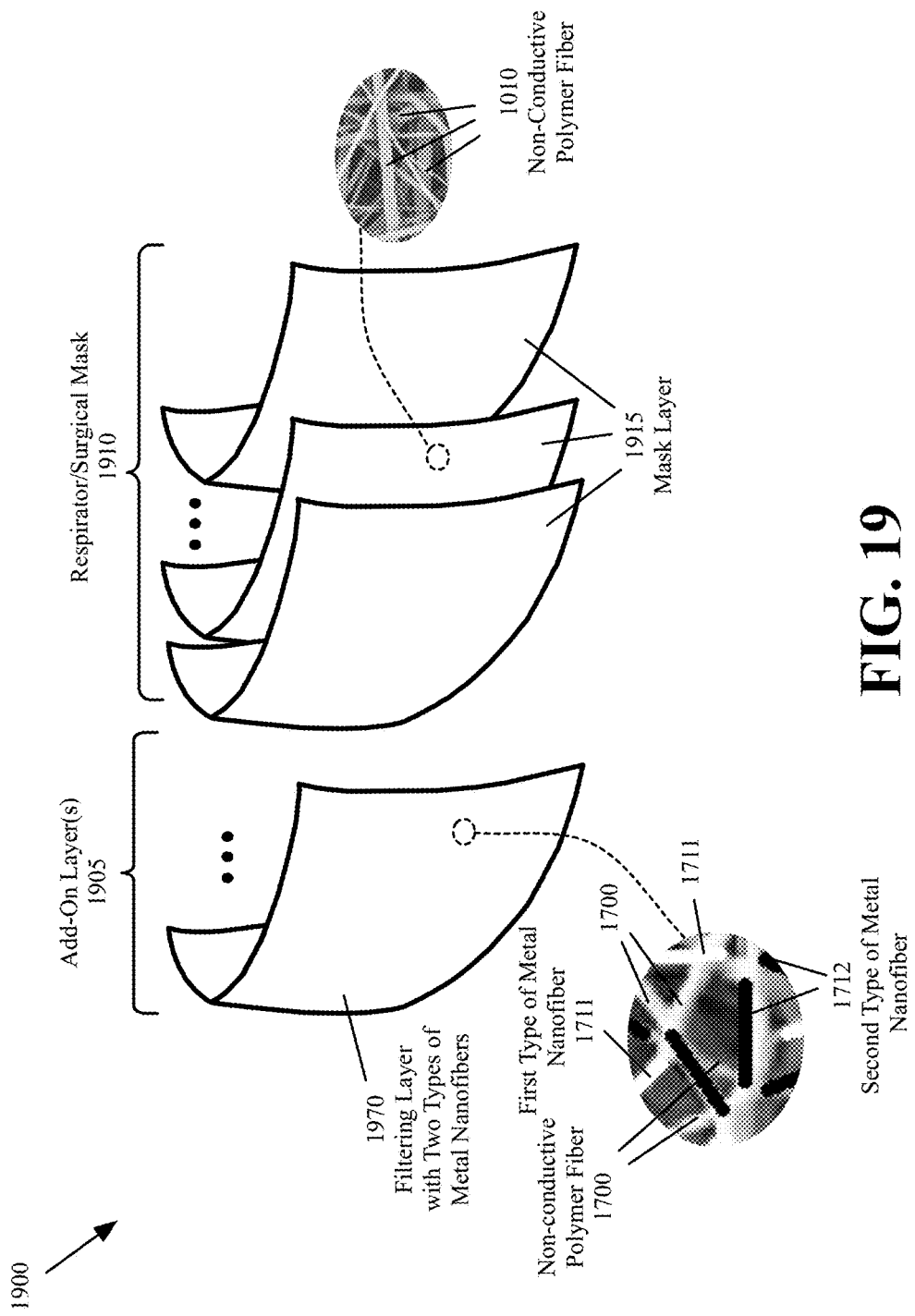
FIG. 19 is a perspective view of a respirator that includes one or more filtering layers made of polymer fibers that are embedded with nanofibers of two different metals, which may be worn as an add on to a respirator or a surgical mask, according to various aspects of the present disclosure.

The masks with nanofibers, in some embodiments, may be worn as an add-on to a respirator or a surgical mask. FIG. 19 is a perspective view of a respirator that includes one or more filtering layers made of polymer fibers that are embedded with nanofibers of two different metals, which may be worn as an add on to a respirator or a surgical mask, according to various aspects of the present disclosure. With reference to FIG. 19, the respirator 1905 with two types of nanofibers may be worn as an add-on over a respirator or a surgical mask 1910.

The number of layers 1915 on the respirator or a surgical mask 1910 may be selected to conform to any of the respirator or surgical mask standards indicated above. In addition, the number of filtering layer(s) 1970 of the add-on layer(s) 1905 may be kept at a minimum (e.g., at one or two) to maintain the flow of air into the respirator/surgical mask 1910. The system 1900 of FIG. 19 has the technical advantage over the standard respirators/surgical masks of providing the additional protection of the electric fields generated by the nanofibers 1711-1712 that may inactivate microorganisms inside aerosol droplets.

Figure 20:
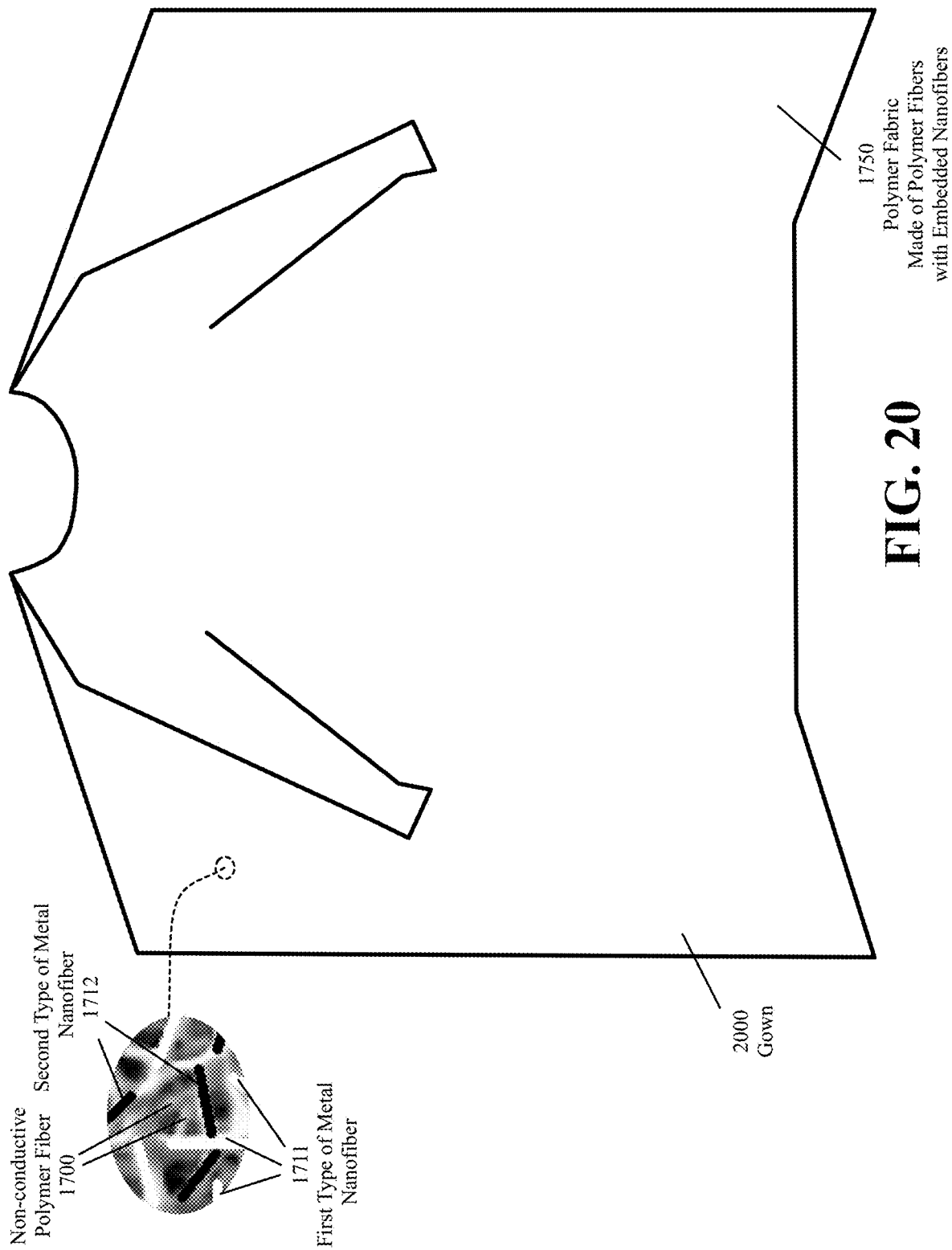
FIG. 20 is a front view of a gown made of a fabric with non-conductive polymer fibers embedded with nanofibers of two different metals, according to various aspects of the present disclosure.

The polymer fabric 1750 (FIGS. 17A-17B) made of polymer fibers and two types of metal nanofibers of the present embodiments may be used in other PPE, such as, for example, and without limitations, gowns, footwear covers, etc. FIG. 20 is a front view of a gown made of a fabric with non-conductive polymer fibers embedded with nanofibers of two different metals, according to various aspects of the present disclosure. With reference to FIG. 20, the gown 2000 may be made of a polymer fabric 1750 with two non-conductive nanofibers 1700 that are embedded with different types of metal nanofibers 1711-1712, as described above with reference to FIGS. 17A-17B. The polymer fibers 1700 in the polymer fabric 1750 may be made of a material such as, for example, and without limitations, non-woven polyester fiber, non-woven polypropylene to conform with one or more standards for the PPE clothing.

Figure 21:
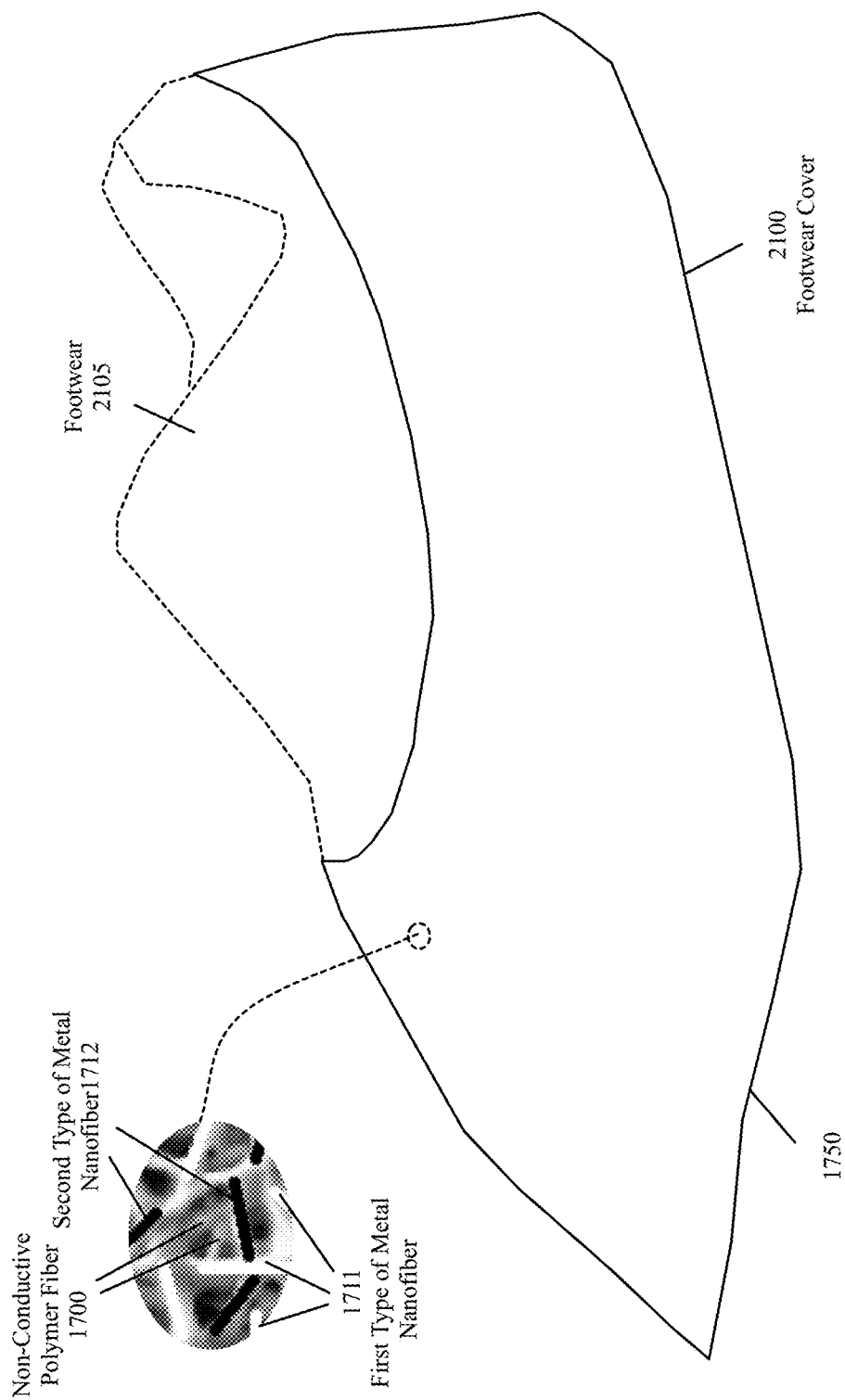
FIG. 21 is a perspective view of a footwear cover made of a fabric with non-conductive polymer fibers embedded with nanofibers of two different metals, according to various aspects of the present disclosure.

FIG. 21 is a footwear cover made of a fabric with non-conductive polymer fibers embedded with nanofibers of two different metals, according to various aspects of the present disclosure. With reference to FIG. 21, the footwear cover 2100 may be made of a polymer fabric 1750 with non-conductive nanofibers 1700 that are embedded with two different metal nanofibers 1711-1712, as described above with reference to FIG. 9. The footwear cover 2100 may be worn over a footwear such as a shoe 2105. The polymer fibers 1700 in the polymer fabric 1750 may be made of a material such as, for example, and without limitations, non-woven polyester fiber, non-woven polypropylene to conform with one or more standards for the PPE clothing.

The PPEs of FIGS. 20 and 21, such as, for example, and without limitations, gowns, footwear covers, have the technical advantage over the standard PPEs of providing the additional protection of the electric fields generated by the nanofibers 1711-1712 of two different metals that may inactivate (as described above) microorganisms inside aerosol droplets.

In a first aspect, a face mask comprises: first and second conductive layers made of a conductive fabric; at least one filtering and insulating layer between the first and second layers; and a power source comprising: a set of one or more batteries configured to generate a direct current (DC) voltage; an oscillator connected to the set of batteries and configured to convert a DC voltage generated by the set of batteries to a periodic voltage; and a high voltage transformer configured to amplify an amplitude of the periodic voltage generated by the oscillator; wherein the amplified periodic voltage generated by the transformer is connected by a first conductor to the first conductive layer, and wherein the amplified periodic voltage generated by the transformer is connected by a second conductor to the second conductive layer.

In an embodiment of the first aspect, the high voltage transformer comprises a first coil and a second coil, wherein the first coil receives the periodic voltage from the oscillator, wherein the second coil generates the amplified periodic voltage that is connected to the first and second conductive layers, wherein the second coil comprise more windings than the first coil.

An embodiment of the first aspect further comprises a nonconductive porous layer positioned between the second conductive layer and a face of a person that is wearing the mask.

In another embodiment of the first aspect, the set of batteries is rechargeable.

In another embodiment of the first aspect, the periodic voltage generated by the oscillator comprises a substantially rectangular wave, wherein the power source is configured to generate the substantially rectangular wave with an amplitude, a fundamental frequency, a plurality of harmonic frequencies, and a duty cycle that inactivate one or more type of microorganisms.

In another embodiment of the first aspect, the duty cycle of the substantially rectangular wave is less than or equal to 10%.

In another embodiment of the first aspect, the periodic voltage generated by the oscillator comprises one of a pulse wave, a triangle wave, a sawtooth wave, and an irregular-shaped periodic wave.

In another embodiment of the first aspect, the high voltage transformer generates an electric field of at least 30 Kilovolts per centimeter (kv/cm).

Another embodiment of the first aspect further comprises a pouch attached to an outside surface of the mask, wherein the pouch is configured to hold the power source.

Another embodiment of the first aspect further comprises a container for placing on a wearer's body, wherein the container is configured to hold the power source.

In another embodiment of the first aspect, the conductive fabric is made with one of woven metal strands and metal-coated yarns.

In another embodiment of the first aspect, the conductive fabric is conductive Lycra fabric.

In another embodiment of the first aspect, the conductive fabric comprises a non-conductive substrate coated with electrically conductive elements.

In another embodiment of the first aspect, the at least one filtering and the insulating layer is an air filter meeting the high-efficiency particulate air (HEPA) standard.

In another embodiment of the first aspect, the at least one filtering and insulating layer is an air filter meeting the N95 standard filtration performance.

In another embodiment of the first aspect, the at least one filtering and insulating layer is made of a non-woven polymer fiber.

In another embodiment of the first aspect, the polymer fiber comprises one of a polyester and polypropylene.

Another embodiment of the first aspect further comprises a plurality of fasteners configured to attach the face mask to a face of a wearer such that the face mask covers the wearer's mouth and at least part of the wearer's nose, and respiration air is drawn through the first conductive layer, the at least one filtering and insulating layer, and the second conductive layer.

Another embodiment of the first aspect further comprises an on/off switch configured to turn the power source on or off.

In another embodiment of the first aspect, the second conductive layer of the face mask is configured to be attached to an outside layer of a surgical mask or a respirator mask.

In a second aspect, a face mask for generating an electric field to disable biological agents is provided. The face mask comprises: a plurality of filtering layers made of non-woven non-conductive polymer fibers; wherein the non-woven non-conductive polymer fibers in at least one of the plurality of filtering layers are embedded with a first nanoparticle made of a first metal and a second nanoparticle made of a second metal, wherein the first metal is different than the second metal, wherein the first and second metals have different standard electrode potentials such that when a nanoparticle of the first metal and a nanoparticle of the second metal are connected by an aerosol droplet, an electric potential is generated between the first and second nanoparticles through the aerosol droplet.

In an embodiment of the second aspect, the first and second metals are one of sodium, magnesium, aluminum, manganese, zinc, chromium, tungsten, iron, calcium, cobalt, nickel, tin, copper, and silver.

In another embodiment of the second aspect, the least one filtering layer comprises at least 1% by weight the first nanoparticle made of the first metal and at least 1% by weight the second nanoparticle made of the second metal.

In another embodiment of the second aspect, the non-conductive polymer is one of polyester and polypropylene.

An embodiment of the second aspect further comprises a plurality of fasteners configured to attach the face mask to the face of a wearer such that the face mask covers the wearer's mouth and at least part of the wearer's nose, and respiration air is drawn through the filtering layers.

In another embodiment of the second aspect, the inner layer of the face mask is configured to be attached to an outside layer of a surgical mask or a respirator mask.

In a third aspect, a face mask for generating an electric field to disable biological agents is provided. The face mask comprises: a plurality of filtering layers made of non-woven non-conductive polymer fibers; wherein the non-woven non-conductive polymer fibers in at least one of the plurality of filtering layers are embedded with a first nanofiber made of a first metal and a second nanofiber made of a second metal, wherein the first metal is different than the second metal, wherein the first and second metals have different standard electrode potentials such that when a nanofiber made of the first metal and a nanofiber made of the second nanofiber are connected by an aerosol droplet, an electric field is generated between the nanofiber made of the first metal and the nanofiber made of the second nanofiber through the aerosol droplet.

In an embodiment of the third aspect, the first and second metals are one of sodium, magnesium, aluminum, manganese, zinc, chromium, tungsten, iron, calcium, cobalt, nickel, tin, copper, and silver.

In another embodiment of the third aspect, the at least one filtering layer comprises at least 1% by weight the nanofiber made of the first metal and at least 1% by weight the nanofiber made of the second metal.

In another embodiment of the third aspect, the non-conductive polymer comprises one of polyester and polypropylene.

An embodiment of the third aspect further comprises a plurality of fasteners configured to attach the face mask to a face of a wearer such that the face mask covers the wearer's mouth and at least part of the wearer's nose, and respiration air is drawn through the outer, filter, and inner layers.

In another embodiment of the third aspect, the inner layer of the face mask is configured to be attached to an outside layer of a surgical mask or a respirator mask.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A face mask for generating an electric field to disable biological agents, the face mask comprising:
a plurality of filtering layers made of non-woven non-conductive polymer fibers;

wherein the non-woven non-conductive polymer fibers in at least one of the plurality of filtering layers are embedded with a first nanoparticle made of a first metal and a second nanoparticle made of a second metal, wherein the first metal is different than the second metal, wherein the first and second metals have different standard electrode potentials such that when a nanoparticle of the first metal and a nanoparticle of the second metal are connected by an aerosol droplet, an electric potential is generated between the first and second nanoparticles through the aerosol droplet.

2. The face mask of claim 1, wherein the first and second metals are each one of sodium, magnesium, aluminum, manganese, zinc, chromium, tungsten, iron, calcium, cobalt, nickel, tin, copper, and silver.

3. The face mask of claim 1, wherein said at least one filtering layer comprises at least 0.01% by weight the first nanoparticle made of the first metal and at least 0.01% by weight the second nanoparticle made of the second metal.

4. The face mask of claim 3, wherein an average distance of the adjacent nanoparticles of the first and second metals in said at least one filtering layer is 300 nanometers (nm).

5. The face mask of claim 1, wherein the non-conductive polymer is one of polyester and polypropylene.

6. The face mask of claim 1 further comprising a plurality of fasteners configured to attach the face mask to a face of a wearer such that the face mask covers the wearer's mouth and at least part of the wearer's nose, and respiration air is drawn through the filtering layers.

7. The face mask of claim 1, wherein an inner layer of the face mask is configured to be attached to an outside layer of a surgical mask or a respirator mask.

8. The face mask of claim 1, wherein the nanoparticles of the first metal are nanoparticles of zinc, wherein the nanoparticles of the second metal are nanoparticles of silver, and wherein the electric potential generated between the first and second nanoparticles through the aerosol droplet is at least 1.5 volts.

9. The face mask of claim 1, wherein the nanoparticles of the first metal are nanoparticles of zinc, wherein the nanoparticles of the second metal are nanoparticles of gold, and wherein the electric potential generated between the first and second nanoparticles through the aerosol droplet is at least 2.2 volts.

* * * * *